(12) United States Patent
Itoh et al.

(10) Patent No.: US 6,237,351 B1
(45) Date of Patent: May 29, 2001

(54) HEAT PUMP TYPE REFRIGERANT CYCLE SYSTEM

(75) Inventors: Satoshi Itoh, Kariya; Kunio Iritani, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/397,187

(22) Filed: Sep. 16, 1999

(30) Foreign Application Priority Data

Sep. 24, 1998 (JP) .................................................. 10-269964
Mar. 19, 1999 (JP) .................................................. 11-076563

(51) Int. Cl.⁷ .............................. F25B 41/00; F25B 13/00
(52) U.S. Cl. ...................... 62/196.3; 62/324.1; 62/324.6; 62/113
(58) Field of Search ............................... 62/196.3, 324.1, 62/324.4, 324.6, 113, 513

(56) References Cited

U.S. PATENT DOCUMENTS

| 4,727,725 | * | 3/1988 | Nagata et al. | ....................... 62/196.3 |
|---|---|---|---|---|
| 5,095,712 | * | 3/1992 | Narreau | .................. 62/113 |
| 5,174,123 | * | 12/1992 | Erickson | ................. 62/113 |
| 5,388,421 | * | 2/1995 | Matsuoka | .............. 62/209 |
| 5,704,219 | * | 1/1998 | Suzuki et al. | ........................... 62/222 |
| 5,848,537 | * | 12/1998 | Biancardi et al. | ................ 62/324.6 |
| 6,047,556 | * | 4/2000 | Lifson | ................. 62/196.2 |

* cited by examiner

Primary Examiner—William Doerrler
(74) Attorney, Agent, or Firm—Harness, Dickey & Pierce, PLC

(57) ABSTRACT

When a heating mode is set in a refrigerant cycle system, air is heated in a condenser by condensing high-pressure gas refrigerant, a part of high-pressure refrigerant from the condenser is decompressed in a pressure reducing unit to a middle pressure, and the other part of high-pressure refrigerant from the condenser is heat-exchanged with the middle-pressure refrigerant having passed through the pressure reducing unit in a refrigerant-refrigerant heat exchanger. Therefore, middle-pressure refrigerant having passed through the pressure reducing unit is evaporated in the refrigerant-refrigerant heat exchanger and the evaporated middle-pressure refrigerant is introduced into a gas injection port of a compressor. Thus, in the refrigerant cycle system, heating capacity can be improved due to the gas refrigerant injection into the compressor.

27 Claims, 13 Drawing Sheets

POSITION OF LEVER 51

| MODE \ MEMBER | VALVE 28a | VALVE 28b | UNIT 26 | UNIT 27 | DOOR 16,17 |
|---|---|---|---|---|---|
| HEATING | OPEN | CLOSE | CONTROL OPENING DEGREE | CONTROL OPENING DEGREE | OPEN |
| COOLING | CLOSE | OPEN | CLOSE | CLOSE | CLOSE |
| DEHUMIDIFYING | CLOSE | CLOSE | CLOSE | CONTROL OPENING DEGREE | OPEN |

— FIRST EMBODIMENT
----- COMPARISON

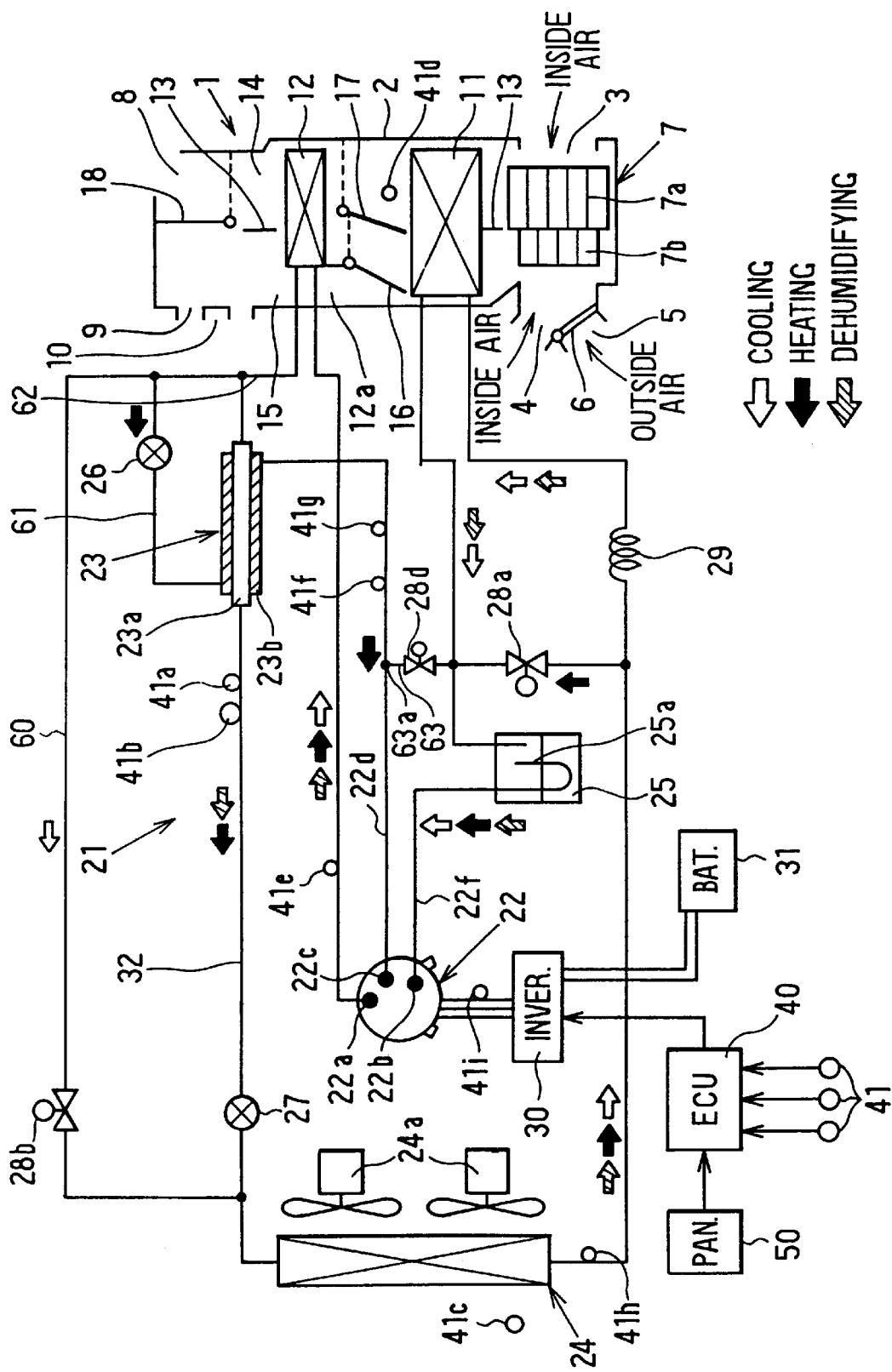

HEAT PUMP TYPE REFRIGERANT CYCLE SYSTEM

CROSS-REFERENCE TO RELATED APPLICATION

This application is related to and claims priority from Japanese Patent Applications No. Hei. 10-269964 filed on Sep. 24, 1998 and No. Hei. 11-76563 filed on Mar. 19, 1999, the contents of which are hereby incorporated by reference.

BACKGROUND OF THE INVENTION

1. Field of the Invention

The present invention relates to a heat pump type refrigerant cycle system which improves heating capacity by injecting middle-pressure gas refrigerant into a compressor. The refrigerant cycle system is suitably used for an electrical vehicle air conditioner, for example.

2. Description of Related Art

In a vehicle such as an electrical vehicle, because it is impossible to heat a passenger compartment by using engine-cooling water as a heating source, a heat pump type refrigerant cycle system is mounted on the vehicle, and the passenger compartment is heated by refrigerant-condensing heat in a condenser. However, when the refrigerant cycle system is used in an outside air temperature lower than $-10°$ C., heat-absorbing amount of refrigerant in an exterior heat exchanger used as an evaporator for heating operation is decreased, and pressure of refrigerant sucked into a compressor is decreased. Therefore, refrigerant specific volume sucked into the compressor is increased, and an amount of refrigerant circulating in the refrigerant cycle system is decreased. Consequently, there occurs a problem that heating capacity for the passenger compartment becomes insufficient.

To overcome the problem, in a refrigerant cycle system described in U.S. Pat. No. 5,704,219, high-pressure refrigerant is pressure-reduced to a middle pressure during the heating operation, the middle-pressure refrigerant is separated into gas refrigerant and liquid refrigerant in a gas-liquid separator, and the gas refrigerant having the middle pressure is injected into a compressor. Therefore, a compression amount of refrigerant in the compressor is increased in the heating operation, and the heating capacity for the passenger compartment is improved. Further, in the conventional refrigerant cycle system, an evaporator of the refrigerant cycle system is disposed on an upstream air side of an air passage of an air conditioning unit, and a condenser of the refrigerant cycle system is disposed in the air passage on a downstream air side from the evaporator, so that defrosting operation for defrosting a windshield is performed.

However, in the conventional refrigerant cycle system, during heating operation, the middle-pressure gas refrigerant separated in the gas-liquid separator is decompressed to a low pressure by a thermal expansion valve, and the low-pressure refrigerant is evaporated in the exterior heat exchanger, so that super-cooling degree of refrigerant sucked into the compressor is adjusted by the thermal expansion valve. Therefore, when the heating operation is performed with low load, a flow rate of refrigerant flowing into the exterior heat exchanger is decreased by decreasing a rotation speed of the compressor, and oil contained in refrigerant tends to stay in the exterior heat exchanger. As a result, an oil amount returning to the compressor is decreased.

On the other hand, a refrigerant flow in the refrigerant cycle system is switched by using a four-way valve disposed in a refrigerant discharge side of the compressor, so that gas refrigerant discharged from the compressor is introduced into the exterior heat exchanger during the cooling operation or is introduced into the interior condenser during the heating operation. Further, middle-pressure gas refrigerant is separated from liquid pressure in the gas-liquid separator before being injected into the compressor. Thus, refrigerant pipe structure of the refrigerant cycle system becomes complex, and component number thereof is increased.

SUMMARY OF THE INVENTION

In view of the foregoing problems, it is an object of the present invention to provide a refrigerant cycle system which improves both heating capacity and oil-returning performance into the compressor.

In is a second object of the present invention to provide a refrigerant cycle system which improves heating capacity by injecting middle-pressure gas refrigerant into a compressor while a refrigerant passage structure becomes simple.

According to the present invention, in a refrigerant cycle system, high-pressure gas refrigerant discharged from a discharge port of a compressor flows into a condenser disposed in an air passage to be condensed in the condenser, a part of high-pressure refrigerant discharged from the condenser is decompressed in a first pressure reducing unit to have a middle pressure during a heating mode for heating a compartment, and the other part of high-pressure refrigerant discharged from the condenser flows into a refrigerant-refrigerant heat exchanger to be heat-exchanged with middle-pressure refrigerant having passed through the first pressure reducing unit in the refrigerant-refrigerant heat exchanger during the heating mode. Therefore, in the refrigerant-refrigerant heat exchanger, middle-pressure refrigerant having passed through the first pressure reducing unit is evaporated and high-pressure refrigerant directly from the condenser is cooled, during the heating mode. In the refrigerant cycle system, during the heating mode, evaporated middle-pressure gas refrigerant is introduced into a gas injection port of the compressor. Thus, a compression amount of the compressor can be increased during the heating mode, and heating capacity for the compartment can be improved in the refrigerant cycle system. Further, because the gas refrigerant injection into the compressor is performed by using the refrigerant-refrigerant heat exchanger, a gas-liquid separator for separating middle-pressure gas-liquid refrigerant is not necessary.

Preferably, the refrigerant cycle system further includes a second pressure reducing unit for decompressing high-pressure refrigerant cooled in the refrigerant-refrigerant heat exchanger to a low pressure during the heating mode, an exterior heat exchanger for performing heat exchange between low-pressure refrigerant after passing through the second pressure reducing unit and outside air during the heating mode, and an accumulator for separating low-pressure refrigerant from the exterior heat exchanger during the heating mode into gas refrigerant and liquid refrigerant and for introducing gas refrigerant and liquid refrigerant containing oil into a suction port of the compressor. Therefore, oil contained in liquid refrigerant can be accurately returned from the accumulator into the compressor together with gas refrigerant, even in low-load heating operation where the compressor is rotated with a low rotation speed and a refrigerant amount flowing through the exterior heat exchanger is decreased. Thus, the refrigerant cycle system improves heating capacity by injecting middle-pressure gas refrigerant from the refrigerant-refrigerant heat exchanger into the compressor, while improving oil-returning performance into the compressor.

Further, the refrigerant cycle system includes an evaporator disposed in the air passage on an upstream air side from the condenser, and a third pressure reducing unit for decompressing refrigerant before being introduced into the evaporator to a low pressure during a cooling mode for cooling the compartment. During the cooling mode in the refrigerant cycle system, high-pressure gas refrigerant discharged from the compressor is heat-exchanged with outside air in the exterior heat exchanger, and low-pressure refrigerant having passed through the evaporator is separated in the accumulator.

When the heating mode is set in the refrigerant cycle system, air passes through the condenser, and refrigerant discharged from the discharge port of the compressor circulates through the condenser, the refrigerant-refrigerant heat exchanger, the second pressure reducing unit, the exterior heat exchanger, the accumulator and the suction port of the compressor in this order, while refrigerant discharged from the discharge port of the compressor circulates through the condenser, the first pressure reducing unit, the refrigerant-refrigerant heat exchanger and the gas injection port of the compressor in this order. When the cooling mode is set in the refrigerant cycle system, air mainly passes through an air bypass passage through which air bypasses the condenser, and refrigerant discharged from the discharge port of the compressor circulates at least through the condenser, the exterior heat exchanger, the third pressure reducing unit, the evaporator, the accumulator and the suction port of the compressor in this order. Further, when a dehumidifying mode for dehumidifying the compartment is set in the refrigerant cycle system, air mainly passes through the condenser, and refrigerant discharged from the discharge port of the compressor circulates through the condenser, the refrigerant-refrigerant heat exchanger, the exterior heat exchanger, the third pressure reducing unit, the evaporator, the accumulator and the suction port of the compressor in this order, while bypassing the second pressure reducing unit. Thus, in the refrigerant cycle system where the heating mode, the cooling mode or the dehumidifying mode can be set, gas refrigerant discharged from the discharge port of the compressor always flows in one way toward the exterior heat exchanger through the condenser. As a result, component number of the refrigerant cycle system can be reduced, and the structure thereof can be made simple.

Preferably, the refrigerant cycle system can set a first dehumidifying operation where temperature of air blown from an air outlet into the compartment is higher than a predetermined temperature, and a second dehumidifying operation where temperature of air blown from the air outlet is lower than the predetermined temperature, during the dehumidifying mode. In the first dehumidifying operation, an opening degree of the second pressure reducing unit is controlled so that refrigerant flowing through the exterior heat exchanger is evaporated by outside air. On the other hand, in the second dehumidifying operation, the opening degree of the second pressure reducing unit is controlled so that refrigerant flowing through the exterior heat exchanger is condensed by outside air. Thus, by controlling the opening degree of the second pressure reducing unit, the exterior heat exchanger can be used as an evaporator or a condenser. Accordingly, heat absorption effect and heat radiation effect can be switched in the exterior heat exchanger, and dehumidifying performance for the compartment can be improved.

Further, the refrigerant cycle system can set a first heating operation where temperature of air blown from the air outlet is higher than a predetermined temperature, and a second heating operation where temperature of air blown from the air outlet is lower than the predetermined temperature, during the heating mode. In the first heating operation, middle-pressure refrigerant is supplied from the refrigerant-refrigerant heat exchanger into the gas injection port of the compressor. On the other hand, in the second heating operation, the supply of middle-pressure refrigerant from the refrigerant-refrigerant heat exchanger to the gas injection port of the compressor is stopped. Thus, in the heating mode, gas refrigerant injection into the compressor can be switched, the heat-radiating amount from the condenser can be controlled, and temperature of air blown into the compartment can be effectively adjusted.

Preferably, the refrigerant cycle includes a first refrigerant bypass passage through which refrigerant discharged from the condenser is directly introduced into the exterior heat exchanger while bypassing the refrigerant-refrigerant heat exchanger and the second pressure reducing unit, a first opening/closing unit disposed in the first refrigerant bypass passage, and the first opening/closing unit is opened during the cooling mode so that refrigerant from the condenser passes through the first refrigerant bypass passage while bypassing the refrigerant-refrigerant heat exchanger and the second pressure reducing unit. Therefore, during the cooling mode, refrigerant can be directly introduced from the condenser into a refrigerant inlet side of the exterior heat exchanger while bypassing the refrigerant-refrigerant heat exchanger. Thus, pressure loss due to the refrigerant-refrigerant heat exchanger can be prevented, and cycle effect during the cooling mode can be increased.

Still mode preferably, the refrigerant cycle includes a gas injection passage through which middle-pressure refrigerant from the refrigerant-refrigerant heat exchanger is injected into the gas injection port of the compressor, and a second refrigerant bypass passage through which refrigerant in the gas injection passage on an upstream refrigerant side of the gas injection port is directly introduced into a refrigerant inlet side of the accumulator. Therefore, when the second refrigerant bypass passage is opened at a starting time of the heating mode, liquid refrigerant staying in the gas injection passage can be introduced into the accumulator through the second refrigerant bypass passage, so that it can effectively prevent liquid refrigerant from flowing into the gas injection port of the compressor.

BRIEF DESCRIPTION OF THE DRAWINGS

Additional objects and advantages of the present invention will be more readily apparent from the following detailed description of preferred embodiments when taken together with the accompanying drawings, in which:

FIG. 18 is a schematic diagram showing a refrigerant cycle system according to a sixth preferred embodiment of the present invention.

DETAILED DESCRIPTION OF THE PRESENTLY PREFERRED EMBODIMENTS

Preferred embodiments of the present invention will be described hereinafter with reference to the accompanying drawings.

Figure 1:
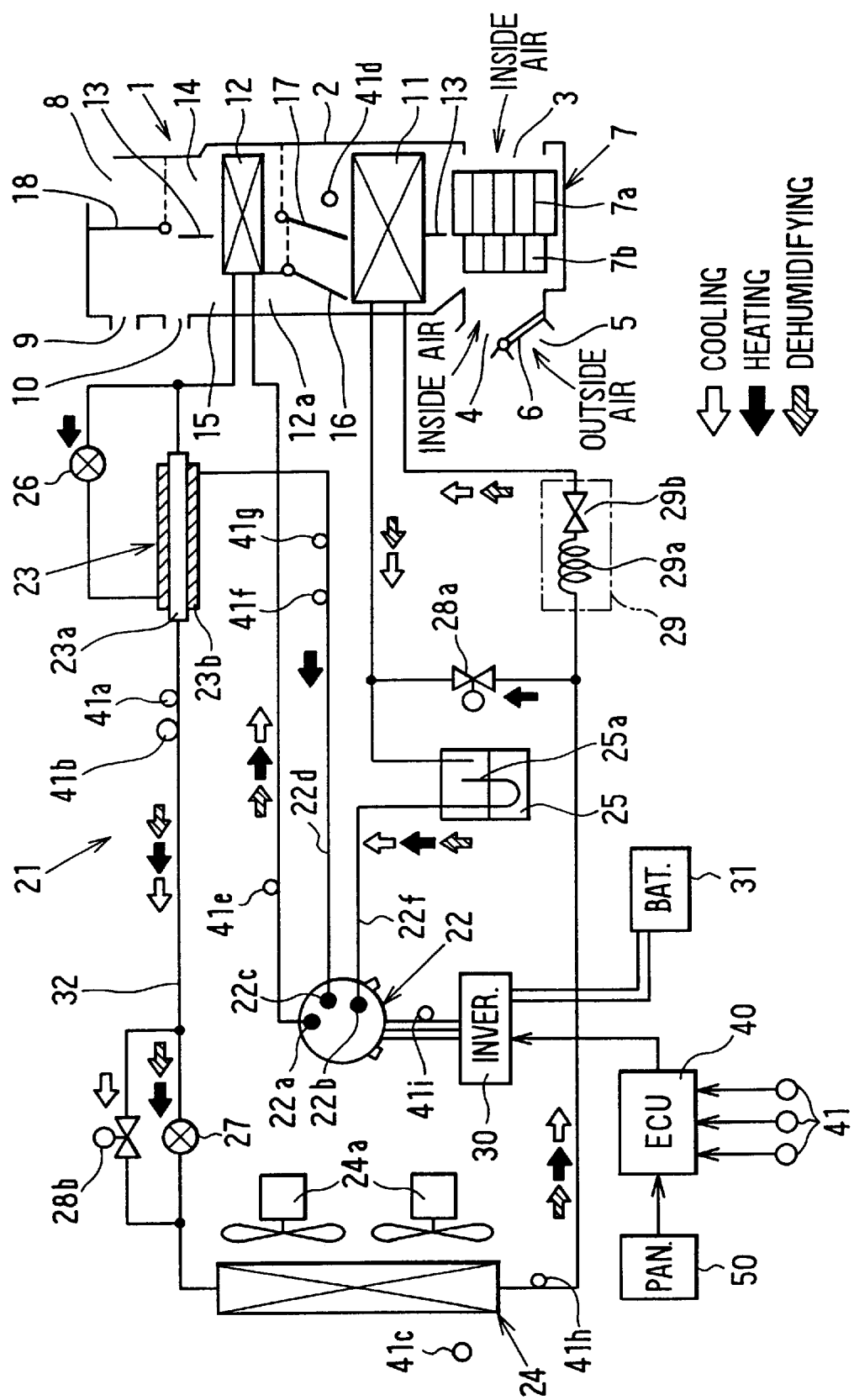
FIG. 1 is a schematic diagram showing a refrigerant cycle system according to a first preferred embodiment of the present invention.

A first preferred embodiment of the present invention will be now described with reference FIGS. 1–11. In a refrigerant cycle system of the first embodiment, the present invention is typically applied to an air conditioner for an electric vehicle. As shown in FIG. 1, an air conditioning unit 1 is disposed within a passenger compartment, and an air conditioning duct 2 of the air conditioning unit 1 forms an air passage for introducing conditioned air into the passenger compartment. Air inlets 3, 4, 5 are formed at an end of the air conditioning duct 2 for sucking inside/outside air. The air inlet 4 for sucking inside air (i.e., air inside the passenger compartment) and the air inlet 5 for sucking outside air (i.e., air outside the passenger compartment) are switched to be open or closed by an inside/outside air switching door 6.

A blower 7 for blowing air into the air conditioning duct 2 is disposed adjacent to the air inlets 3–5. The blower 7 includes a motor and centrifugal fans 7a, 7b which are driven by the motor. Further, several air outlets communicating with the passenger compartment are formed at the other end of the air conditioning duct 2. The air outlets are a foot air outlet 8 for blowing out conditioned air toward the feet of the passenger in the passenger compartment, a face air outlet 9 for blowing out conditioned air toward the upper half of the body of the passenger in the passenger compartment, and a defroster air outlet 10 for blowing out conditioned air toward the inside surface of the windshield glass.

A cooling evaporator (interior evaporator) 11 is provided within the air conditioning duct 2 on the downstream air side from the blower 7. The cooling evaporator 11 is an interior heat exchanger forming a part of a refrigerating cycle 21 and functions as a refrigerator for dehumidifying and cooling air within the air conditioning duct 2 by the endothermic action of refrigerant flowing therethrough in the cooling and the dehumidifying modes (described later).

Further, a heating condenser (interior condenser) 12 is disposed within the air conditioning duct 2 on the downstream air side from the cooling evaporator 11. The heating condenser 12 is the other interior heat exchanger forming a part of the refrigerating cycle 21 and functions as a heater for heating air within the air conditioning duct 2 by the radiating action of refrigerant flowing therethrough in the heating mode (described later).

The air passage in the air conditioning duct 2 is partitioned by a partition wall 13 into a first air passage 14 on the side of the foot air outlet 8 and a second air passage 15 on the side of the face air outlet 9 and the defroster air outlet 10. The first and second air passages 14, 15 are partitioned to set an inside/outside double layer mode during the heating mode in winter. That is, during the heating mode in winter, high-temperature inside air is sucked from the air inlet 3 into the air passage 14 on the side of the foot air outlet 8 so that warm air is blown toward the feet of the passenger, whereby the load of heating can be reduced. At the same time, the low-humidity outside air is sucked from the air inlet 5 into the air passage 15 on the side of the defroster air outlet 10, whereby the windshield glass can be prevented from being clouded certainly.

Doors 16, 17 control an amount of air passing through the condenser 12 and an amount of air passing through a bypass passage 12a while bypassing the condenser 12. The door 17 is also used as a partition member for partitioning the first air passage 14 and the second air passage 15. A door 18 is disposed on a downstream air side of the partition wall 13 to partition the first and second air passages 14, 15, and to switch a communication state of the first and second air passages 14, 15. Further, the air outlets 8, 9, 10 are opened and closed by a switching door (not shown).

The refrigerating cycle 21 is constituted as a heat pump type refrigerating cycle for performing cooling or heating operation of the passenger compartment with the cooling evaporator 11 and the heating condenser 12, and includes the following equipments in addition to the evaporator 11 and the condenser 12.

That is, the refrigerating cycle 21 includes a refrigerant compressor 22, a refrigerant-refrigerant heat exchanger 23 in which gas-liquid middle-pressure refrigerant is heat-exchanged with high-pressure refrigerant to be evaporated, an exterior heat exchanger 24, an accumulator 25 for separating gas-liquid refrigerant into gaseous refrigerant and liquid refrigerant while accumulating the liquid refrigerant therein, a first pressure reducing unit 26 for reducing pressure of high-pressure refrigerant from the condenser 12 to a middle pressure (for example, about 4–15 kg/cm$^2$), a second pressure reducing unit 27 for reducing pressure of high-pressure refrigerant from an outlet of the refrigerant-refrigerant heat exchanger 23 during the heating operation to a low pressure, a third pressure reducing unit 29 for reducing pressure of condensed high-pressure refrigerant from the exterior heat exchanger 24 during cooling operation to a low pressure, and electromagnetic valves 28a, 28b for switching a refrigerant flow during the cooling operation and the heating operation.

The exterior heat exchanger 24 is installed outside the passenger compartment of the electric vehicle so as to perform heat exchange between refrigerant flowing therethrough and outside air blown by an outdoor electric fan 24a. The refrigerant compressor 22 is electrically operated, while an AC motor (not shown) is integrally disposed within its sealed case and drives the compressor 22 so as to suck, compress and discharge refrigerant. The AC motor of the refrigerant compressor 22 is supplied with AC voltage by an inverter 30. The inverter 30 modulates frequency of AC voltage so that rotational speed of the AC motor continuously varies. Therefore, the inverter 30 is used as a rotational speed adjusting unit of the compressor 22, and is supplied with DC voltage from a battery 31 mounted on the vehicle. The inverter 30 is controlled by an air conditioning control unit 40.

The compressor 22 is equipped with a discharging port 22a for discharging the compressed refrigerant, a suction port 22b for sucking low-pressure refrigerant in the refrigerant cycle, and a gas injection port 22c for injecting middle-pressure gaseous refrigerant from the refrigerant-refrigerant heat exchanger 23. The gas injection port 22c of the compressor 22 communicates with the refrigerant-refrigerant heat exchanger 23 through a gas injection passage 22d.

Each of the first pressure reducing unit 26 and the second pressure reducing unit 27 is an electrical expansion valve for electrically adjusting a valve opening degree. For example, the electrical expansion valve has an electrically driving unit such as a step motor, a movement amount of a valve body is adjusted by the driving unit, and an opening degree of a refrigerant passage is adjusted by the valve body. Further, the third pressure reducing unit 29 is a fixed throttle formed by combining an upstream side capillary tube 29a and a downstream side orifice 29b, for example.

The accumulator 25 has a U-shaped refrigerant outlet pipe 25a. Liquid refrigerant is stored in a bottom side of the accumulator 25, and gas refrigerant is sucked from an up end opening of the refrigerant outlet pipe 25a, so that it can prevent liquid refrigerant from being sucked into the compressor 22 from the up end opening of the refrigerant outlet pipe 25a. Further, a hole (not shown) having a small diameter is provided at a bottom of the U-shaped refrigerant outlet pipe 25a of the accumulator 25, so that liquid refrigerant containing oil is also sucked together with gas refrigerant. Therefore, a sufficient oil amount is returned into the compressor 22.

A refrigerant temperature sensor 41a and a refrigerant pressure sensor 41b for detecting temperature and pressure of high-pressure refrigerant on the outlet side of the refrigerant-refrigerant heat exchanger 23 are disposed in a high-pressure side refrigerant pipe 32 connecting the refrigerant-refrigerant heat exchanger 23 and the exterior heat exchanger 24. Signals output from the sensors 41a, 41b are input into the air conditioning control unit 40, and opening degree of the second pressure reducing unit 27 is controlled based on the input signals so that super-cooling degree of high-pressure refrigerant from the outlet of the refrigerant-refrigerant heat exchanger 23 is controlled.

Further, a middle-pressure refrigerant temperature sensor 41f and a middle-pressure sensor 41g for respectively detecting temperature and pressure of middle-pressure refrigerant decompressed in the first pressure reducing unit 26 are disposed in the gas injection passage 22d. Output signals from the sensors 41f, 41g are input into the air conditioning control unit 40, and an opening degree of the first pressure reducing unit 26 is controlled based on the input signals so that super-heating degree of middle-pressure refrigerant on the outlet side of the refrigerant-refrigerant heat exchanger 23 is controlled.

The air conditioning control unit 40 is an electronic control unit (ECU) including an microcomputer and its relative circuits. Sensing signals from an air conditioning sensor group 41 including an outside air temperature sensor 41c for sensing the outside air temperature, an post-evaporator air temperature sensor 41d for sensing the temperature of the air which has been just blown out from the evaporator 11, a discharge temperature sensor 41e for sensing the temperature of refrigerant discharged from the compressor 21 are input into the air conditioning control unit 40, in addition to signals from the sensors 41a, 41b, 41f, 41g.

Further, signals from each lever and each of switches on an air conditioning control panel 50 (see FIG. 2) disposed near the driver's seat are input to the control unit 40.

Although the electrical connections of the control unit 40 with the other components are not indicated in FIG. 1 while the electrical connection between the inverter 30 and the control unit 40 is indicated, the first and second pressure reducing units 26, 27, electromagnetic valves 28a, 28b, the doors 6, 16, 17, 18, the air outlet mode switching doors, the blower 7 and the outside fan 24a are also controlled by the control unit 40. Each opening/closing operation of the electromagnetic valves 28a, 28b is controlled by the control unit 40 so that the refrigerant flow in the refrigerant cycle 21 is switched to correspond to each operation mode of cooling, heating and dehumidifying modes.

Figure 2:
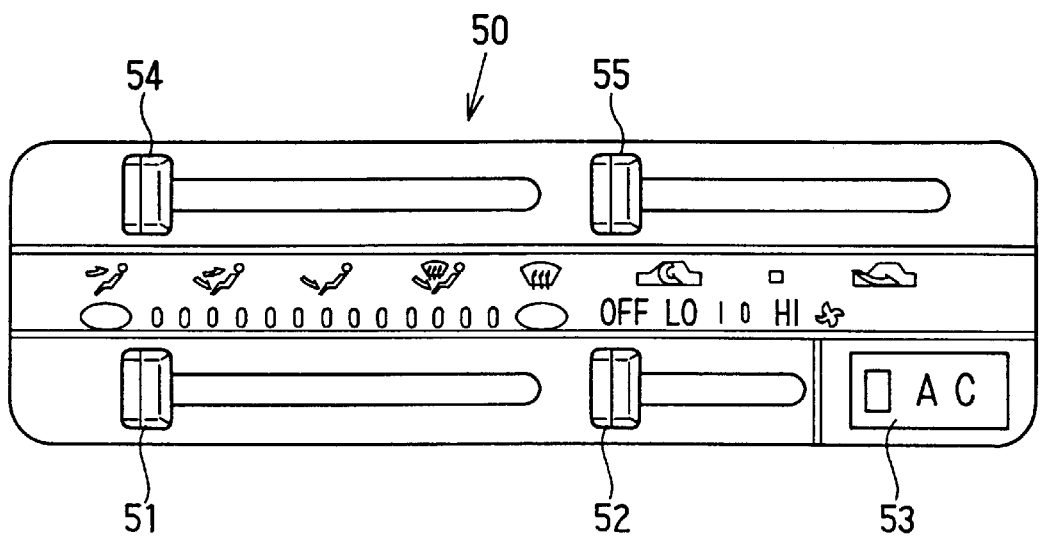
FIG. 2 is a front view showing a control panel of a vehicle air conditioner according to the first embodiment.
Figure 3:
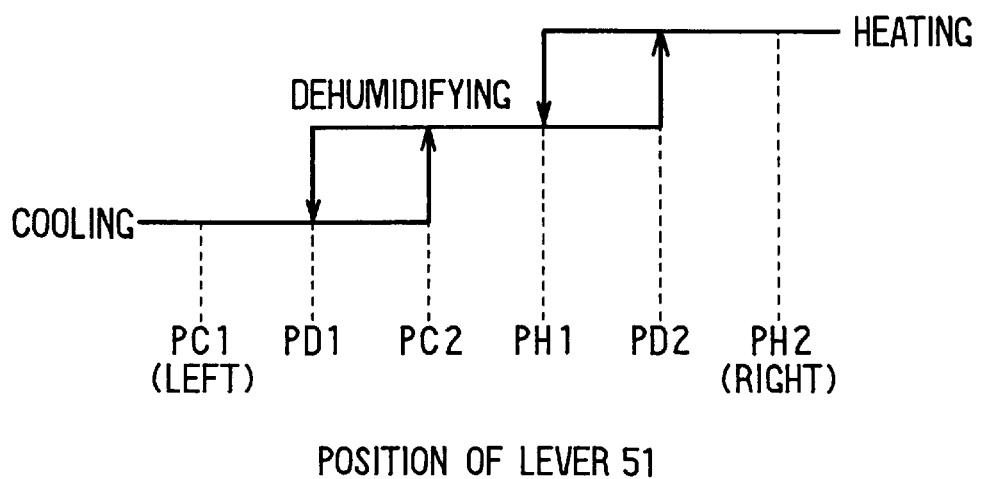
FIG. 3 is a characteristics chart showing operation modes in an entire operation range of a temperature setting lever on the control panel shown in FIG. 2.

The air conditioning control panel 50 shown in FIG. 2 has the following operating members which are manually operated by the passenger. A temperature setting lever 51 sets a target temperature of the air blown into the passenger compartment. In the first embodiment, the temperature setting lever 51 is constructed so as to set a target value for adjusting the rotational speed of the electric compressor 22. Further, the operations of the electromagnetic valves 28a, 28b and switching doors 16, 17 are controlled in response to the target value set by the operated position of the temperature setting lever 51, whereby operation mode of the refrigerating cycle 21 is switched and the heat-exchanging amount of the condenser 12 is controlled. That is, as shown in FIG. 3, when the operated position of the temperature setting lever 51 is moved from the left side to the right side, the cooling mode, the dehumidifying mode and the heating mode are set in this order.

Figure 4:
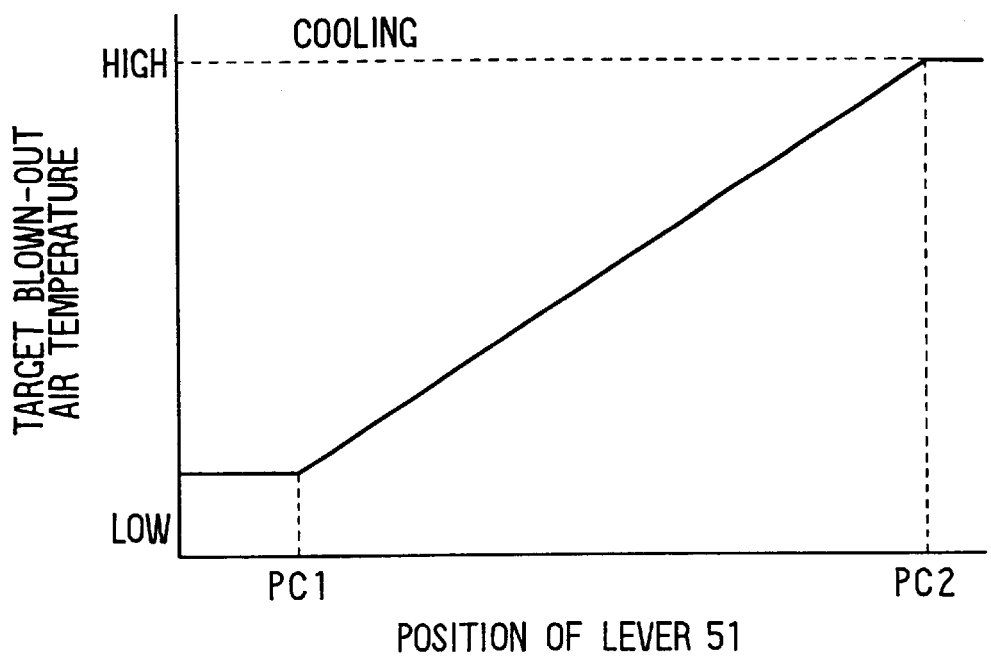
FIG. 4 is a graph showing the relationship between a position of the temperature setting lever and a target blown-out air temperature of an evaporator during cooling mode.
Figure 5:
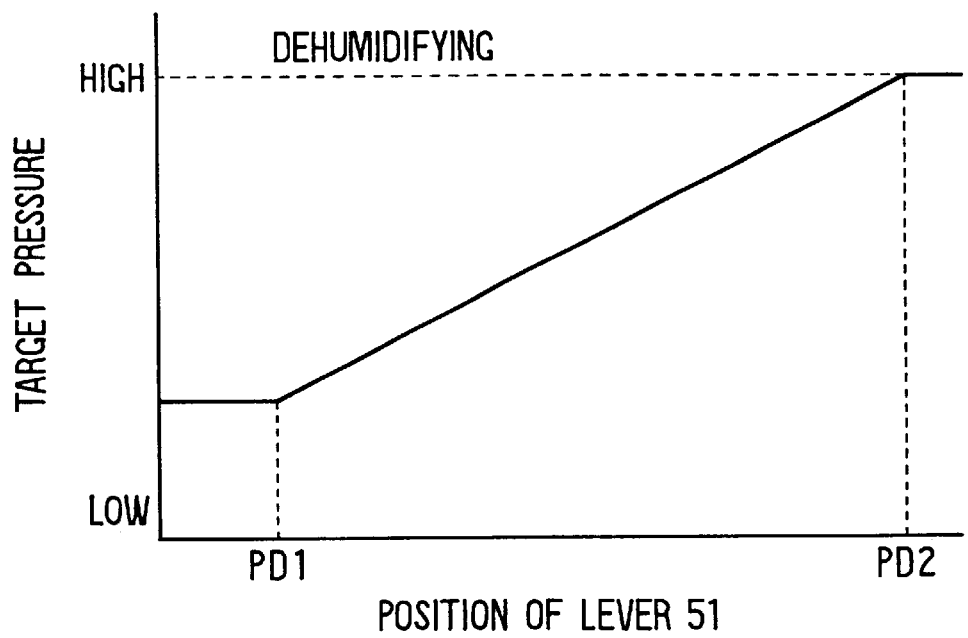
FIG. 5 is a graph showing the relationship between the position of the temperature setting lever and a target high pressure during dehumidifying mode.
Figure 6:
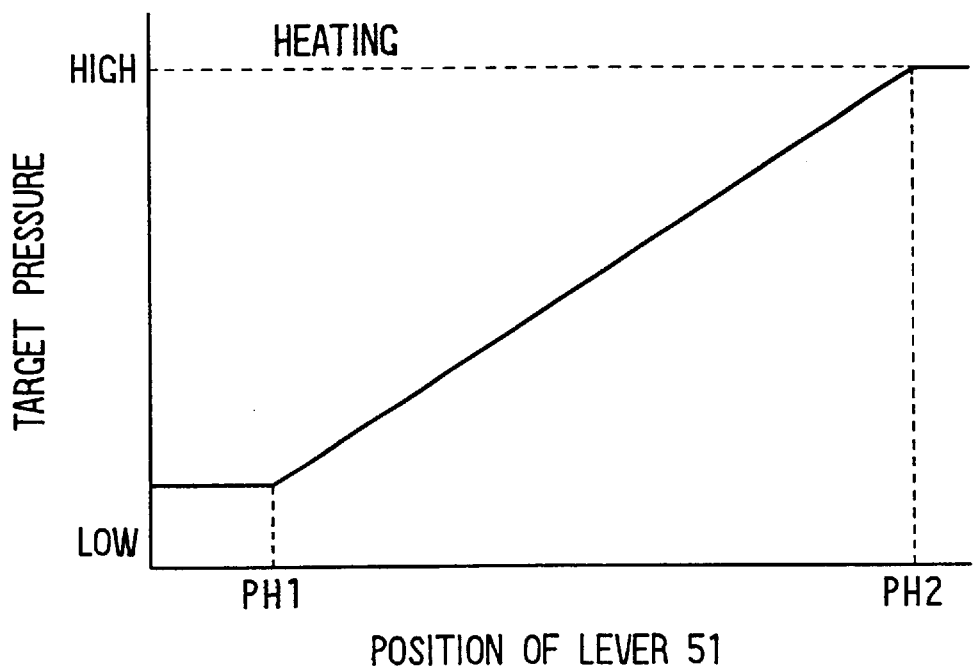
FIG. 6 is a graph showing the relationship between the position of the temperature setting lever and a target high pressure during heating mode.

As shown in FIGS. 4, 5 and 6, the target temperature of the air blown out from the evaporator is set in cooling mode and the target high pressure is set in dehumidifying and heating modes under the movement of the operated position of the temperature setting lever 51.

The signal of the operated position of the temperature setting lever 51 is input to the control unit 40, and the control unit 40 controls the rotational speed of the compressor 22 so that the actual temperature of air blown out from the evaporator 11 or the actual high pressure which are detected by the sensor group 41 corresponds to the target value.

The air conditioning panel 50 is also equipped with a speed switching lever 52 of the blower 7, an air conditioning switch 53 for intermitting the operation of the compressor 22, an air conditioning blown-out mode switching lever 54 for switching the air outlet switching doors (not shown) of the air outlets 8–10, and an inside/outside air switching lever 55 for opening and closing the inside/outside air switching door 6.

Figure 7:
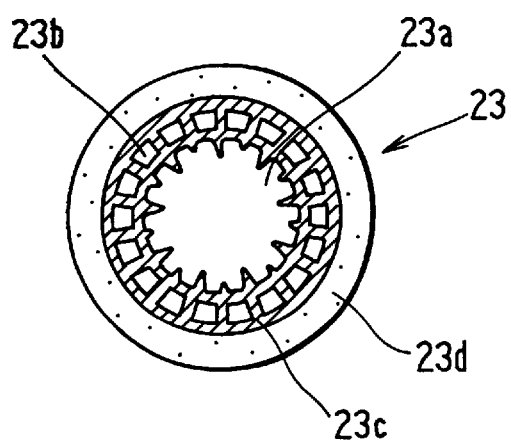
FIG. 7 is a cross-sectional view showing a refrigerant-refrigerant heat exchanger according to the first embodiment.

On the other hand, the refrigerant-refrigerant heat exchanger 23 is formed into a cylindrical shape having a double passage structure in which an inner passage 23a and an outer passage 23b are concentrically formed, as shown in FIG. 7. The inner passage 23a is placed inside the outer passage 23b, and high-pressure refrigerant from the condenser 12 flows toward the exterior heat exchanger 24 through the inner passage 23a. The outer passage 23b is formed by plural passages arranged in a circumferential direction on the outer circumferential side of the inner passage 23a. Middle-pressure refrigerant having passed through the first pressure reducing unit 26 flows through the outer passage 23b, and is introduced into the gas injection port 22c of the compressor 22 through the gas injection passage 22d.

A pipe member 23c forming the inner passage 23a and the outer passage 23b is made of metal such as aluminum having a sufficient heat-transmission performance, and is formed by extrusion, for example. Further, as shown in FIG. 7, a heat-insulation member 23d is attached to an outer surface of the pipe member 23c. Therefore, in the refrigerant-refrigerant heat exchanger 23, heat-exchange only between high-pressure refrigerant within the inner passage 23a and middle-pressure refrigerant within the outer passage 23b can be effectively performed. When the gas injection into the compressor 22 is not necessary, only high-pressure refrigerant flows though the inner passage 23a of the refrigerant-refrigerant heat exchanger 23 by fully closing the first pressure reducing unit 26. In this case, the inner passage 23a is used as a part of the high-pressure side pipe 32.

Next, operation of the refrigerant cycle system according to the first embodiment of the present invention will be now described. When the air conditioning switch 53 is turned on, the signal is input to the control unit 40 so as to start up the compressor 22. When the temperature setting lever 51 is moved between the PH2 position and the PH1 position in FIG. 3, the heating mode is set by the control unit 40, and the electromagnetic valves 28a, 28b and the passage switching doors 16, 17 are controlled to a state of the heating mode shown in FIG. 8.

During the heating mode, refrigerant flows through the refrigerant cycle 21 in a route indicated by arrows of "heating" in FIG. 1. That is, high-pressure high-temperature super-heated gaseous refrigerant discharged from the discharge port 22a of the compressor 22 flows into the condenser 12 disposed inside the air conditioning case 2, and is heat-exchanged with air blown by the blower 7 in the condenser 12 to be condensed in the condenser 12. Air heated by radiation heat generated from the condensation of the gaseous refrigerant is mainly blown from the foot air outlet 8 into the passenger compartment, so that the passenger compartment is heated.

A part of high-pressure gas-liquid two phase refrigerant discharged from the condenser 12 flows into the first pressure reducing unit 26, so that high-pressure gas-liquid two phase refrigerant becomes in middle-pressure gas-liquid two phase refrigerant in the first pressure reducing unit 26. The middle-pressure gas-liquid two phase refrigerant passing through the outer passage 23b of the refrigerant-refrigerant heat exchanger 23 is heat exchanged with the other part of high-pressure refrigerant flowing through the inner passage 23a from the condenser 12, to be gasified in the refrigerant-refrigerant heat exchanger 23. The middle-pressure gasified gas refrigerant flows into the gas injection port 22c of the compressor 22 through the gas injection passage 22d from the outer passage 23b of the refrigerant-refrigerant heat exchanger 23.

On the other hand, high-pressure gas-liquid refrigerant passing through the inner passage 23a of the refrigerant-refrigerant heat exchanger 23 directly from the condenser 12 is heat-exchanged with refrigerant passing through the outer passage 23b to be cooled. During the heating mode, because the electromagnetic valve 28b is closed, the cooled high-pressure refrigerant from the inner passage 23a of the refrigerant-refrigerant heat exchanger 23 flows into the second pressure reducing unit 27, and is press-reduced in the second pressure reducing unit 27 to become in low-pressure refrigerant. Low-pressure refrigerant from the second pressure reducing unit 27 is evaporated by absorbing heat from outside air blown by the exterior fan 24a while passing through the exterior heat exchanger 24.

Gas refrigerant evaporated in the exterior heat exchanger 24 flows into the accumulator 25 after passing through the electromagnetic valve 28a. Liquid refrigerant generated due to the variation of heating load is stored in the accumulator 25. In the accumulator 25, gas refrigerant is sucked from the up end opening of the refrigerant outlet pipe 25a, and liquid refrigerant containing oil is also sucked from the small hole at the bottom of the U-shaped refrigerant outlet pipe 25a to be mixed into the gas refrigerant. Therefore, liquid refrigerant containing oil is also sucked together with gas refrigerant into the suction port 22b of the compressor 22 through a refrigerant suction passage 22f. Thus, even in a low heating load where refrigerant amount circulating in the refrigerant cycle 21 is small, oil amount returning into the compressor 22 can be sufficiently obtained.

The opening degree of the first pressure reducing unit 26 is controlled by the control unit 40 based on signals from the middle-pressure refrigerant temperature sensor 41f and the middle-pressure refrigerant pressure sensor 41g, so that the super-heating degree SH of refrigerant flowing into the gas injection port 22c of the compressor 22 becomes to be a predetermined degree. That is, when the super-heating degree SH of refrigerant injected into the gas injection port 22c becomes larger, the opening degree of the first pressure reducing unit 26 is increased. Alternatively, when the super-heating degree SH of refrigerant injected into the gas injection port 22c becomes smaller, the opening degree of the first pressure reducing unit 26 is reduced.

Further, the opening degree of the second pressure reducing unit 27 is controlled by the control unit 40, so that the super-cooling degree SC of high-pressure refrigerant flowing from the inner passage 23a of the refrigerant-refrigerant heat exchanger 23 becomes to be a predetermined degree. That is, when the super-cooling degree SC of high-pressure refrigerant from the inner passage 23a becomes larger, the opening degree of the second pressure reducing unit 27 is increased so that the super-cooling degree SC is reduced. Alternatively, when the super-cooling degree SC of high-pressure refrigerant from the inner passage 23a becomes smaller, the opening degree of the second pressure reducing unit 27 is decreased so that the super-cooling degree SC is increased.

Figures 8, 9:
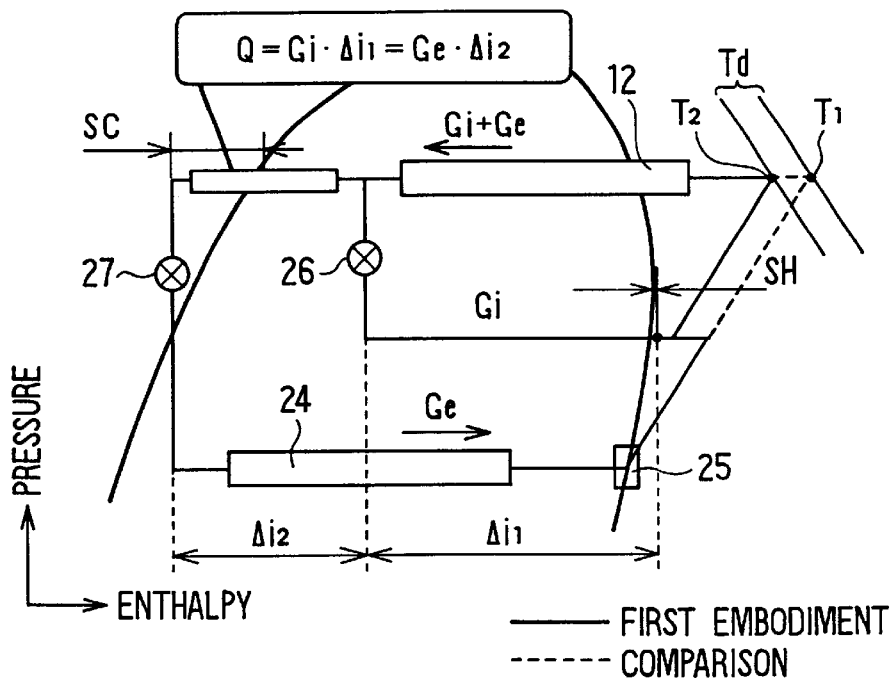
FIG. 8 is a table showing operation states of members of the refrigerant cycle system in each operation mode, according to the first embodiment.
FIG. 9 is a Mollier diagram of the refrigerant cycle system according to the first embodiment, in comparison with a comparison example.

FIG. 9 is a Mollier diagram showing a refrigerant state of the refrigerant cycle 21 during the heating mode. In FIG. 9, "Gi" indicates a flow amount of refrigerant flowing into the gas injection port 22c from the gas injection passage 22d, "Ge" indicates a flow amount of refrigerant sucked into the compressor 22 after passing through the exterior heat exchanger 24, "Δi1" indicates an enthalpy difference of middle-pressure refrigerant due to heat-absorption in the outer passage 23b of the refrigerant-refrigerant heat exchanger 23, and "Δi2" indicates an enthalpy difference of high-pressure refrigerant flowing toward the second pressure reducing unit 27 through the inner passage 23a due to heat-radiation in the inner passage 23a of the refrigerant-refrigerant heat exchanger 23. Thus, in FIG. 9. heat-exchanging amount Q in the refrigerant-refrigerant heat exchanger 23 is obtained by the following formula (1).

$$Q = Gi \cdot \Delta i_1 = Ge \cdot \Delta i_2 \quad (1)$$

Further, during the heating mode, the passage switching doors 16, 17 open the inlet air passage of the condenser 12, and fully close the bypass passage 12a. Thus, during the heating mode, all air blown by the blower 7 is heat-exchanged with high-pressure high-temperature refrigerant discharged from the compressor 22 in the condenser 12 to be heated.

Next, when the temperature setting lever 51 is moved between the PC1 position and the PC2 position in FIG. 3, the cooling mode is set by the control unit 40, and the electromagnetic valves 28a, 28b and the passage switching doors 16, 17 are set in the state of the cooling mode shown in FIG. 8.

During the cooling mode, refrigerant flows in the refrigerant cycle 21 in a flow direction indicated by arrows of "cooling" in FIG. 1. As shown in FIG. 1, during the cooling mode, high-pressure high-temperature super-heating gas refrigerant discharged from the compressor 22 firstly flows into the condenser 12 disposed within the air conditioning case 2. However, because the passage switching doors 16, 17 fully close the air inlet passage of the condenser 12 during the cooling mode, gas refrigerant flowing through the condenser 12 is not heat-exchanged with air blown by the blower 7. That is, all air blown by the blower 7 flows through the bypass passage 12a while bypassing the condenser 12. Therefore, gas refrigerant discharged from the compressor 22 flows into the inner passage 23a of the refrigerant-refrigerant heat exchanger 23 with a high-pressure high-temperature super-heating state. During the cooling mode, because the first pressure reducing unit 26 is fully closed, all refrigerant discharged from the compressor 22 flows into the inner passage 23a of the refrigerant-refrigerant heat exchanger 23 without flowing into the gas injection passage 22d. In this case, middle-pressure low temperature refrigerant does not flow through the outer passage 23b of the refrigerant-refrigerant heat exchanger 23. Therefore, refrigerant passing through the inner passage 23a of the refrigerant-refrigerant heat exchanger 23 is not heat-exchanged in the refrigerant-refrigerant heat exchanger 23, and flows into the exterior heat exchanger 24 after passing through the electromagnetic valve 28b.

In the exterior heat exchanger 24, high-pressure gas refrigerant is heat-exchanged with outside air to be condensed. The condensed refrigerant from the exterior heat exchanger 24 flows into the third pressure reducing unit 29 so that pressure of refrigerant before flowing into the evaporator 11 is reduced into a low pressure in the third pressure reducing unit 29, because the electromagnetic valve 28a is closed. Thereafter, low-pressure refrigerant flows into the evaporator 11 from the third pressure reducing unit 29. Refrigerant is evaporated in the evaporator 11 by absorbing heat from air blown by the blower 7. Therefore, air passing through the evaporator 11 is cooled, and the cooled air passes through the bypass passage 12a while bypassing the condenser 12. During the cooling mode, air cooled in the evaporator 11 is mainly blown from the face air outlet 9 into the passenger compartment to cool the passenger compartment.

Gaseous refrigerant evaporated in the evaporator 11 flows into the accumulator 25. Thereafter, gaseous refrigerant in the accumulator 25 is sucked into the suction port 25b of the compressor 22 through the refrigerant suction passage 22f.

Next, when the temperature setting lever 51 is moved between the PD1 position and the PD2 position in FIG. 3, the dehumidifying mode is set by the control unit 40, and the electromagnetic valves 28a, 28b, the first and second pressure reducing units 26, 27 and the passage switching doors 16, 17 are set as shown in FIG. 8 by the control unit 40. During the dehumidifying mode, refrigerant flows in a flow direction indicated by arrows of dehumidifying in FIG. 1.

That is, high-pressure high-temperature super-heating gas refrigerant discharged from the compressor 22 flows into the condenser 12. In this case, the passage switching doors 16, 17 open the air inlet passage of the condenser 12. Therefore, gas refrigerant introduced into the condenser 12 is condensed in the condenser 12 by heat exchange with air blown by the blower 7. Thus, air passing through the condenser 12 is heated. During the dehumidifying mode, because the first pressure reducing unit 26 disposed in the gas injection passage 22d is fully closed, no refrigerant flows through the gas injection passage 22d. Therefore, an entire amount of high-pressure refrigerant condensed in the condenser 12 passes through the inner passage 23a of the refrigerant-refrigerant heat exchanger 23. That is, refrigerant passes through the inner passage 23a of the refrigerant-refrigerant heat exchanger 23 without performing a heat-exchange. Further, because the electromagnetic valve 28b is closed, high-pressure refrigerant flows into the second pressure reducing unit 27, and pressure of refrigerant is reduced in the second pressure reducing unit 27 to a middle pressure (PM). Middle-pressure refrigerant from the second pressure reducing unit 27 flows into the exterior heat exchanger 24.

Figure 10:
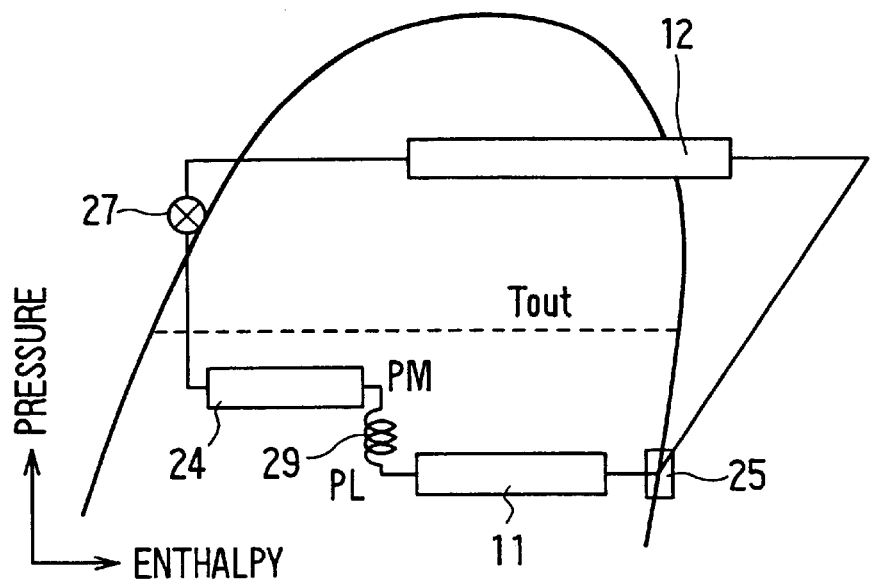
FIG. 10 is a Mollier diagram of the refrigerant cycle system during a first dehumidifying operation D1 according to the first embodiment.

When a first dehumidifying operation D1 where dehumidifying operation is performed with high blown-air temperature is set during the dehumidifying mode, the exterior heat exchanger 24 is used as an evaporator as shown in FIG. 10 by setting the middle pressure of refrigerant having passed through the second pressure reducing unit 27 to be lower than the saturated refrigerant pressure relative to the outside air temperature (Tout). That is, during the first dehumidifying operation, the opening degree of the second pressure reducing unit 27 becomes smaller, so that a press-reducing amount of refrigerant becomes larger and the set middle pressure of refrigerant becomes smaller.

During the dehumidifying mode, because the electromagnetic valve 28a is closed, middle-pressure refrigerant from the exterior heat exchanger 24 flows into the third pressure reducing unit 29, and pressure of refrigerant is reduced to a low pressure (PL) in the third pressure reducing unit 29. Thereafter, low-pressure refrigerant flows into the evaporator 11, is evaporated in the evaporator 11 by absorbing heat of air blown by the blower 7, and flows into the accumulator 25. Gas refrigerant is sucked from the accumulator 25 into the suction port 22b of the compressor 22 through the refrigerant suction passage 22f.

During the dehumidifying mode, refrigerant flows through both the evaporator 11 and the condenser 12 disposed within the air conditioning case 2. Therefore, air blown by the blower 7 is cooled and dehumidified in the evaporator 11, and is heated again in the condenser 12 to be warm air. During the dehumidifying mode, air is mainly blown from the defroster air outlet 10 into the passenger compartment to defrost the windshield and to dehumidify and heat the passenger compartment.

During the first dehumidifying operation D1 shown in FIG. 10 within the dehumidifying mode, because heat-radiation amount Qc of the condenser 12 is the sum total of consumption power L of compressor 22, heat-absorption amount Qeh of the exterior heat exchanger 24 and heat-absorption amount Qe of the evaporator 11. That is, the heat-radiation amount Qc of the condenser 12 is obtained by the following formula (2).

$$Qc=L+Qeh+Qe \qquad (2)$$

Therefore, air blown from the condenser 12 has a high temperature.

Figure 11:
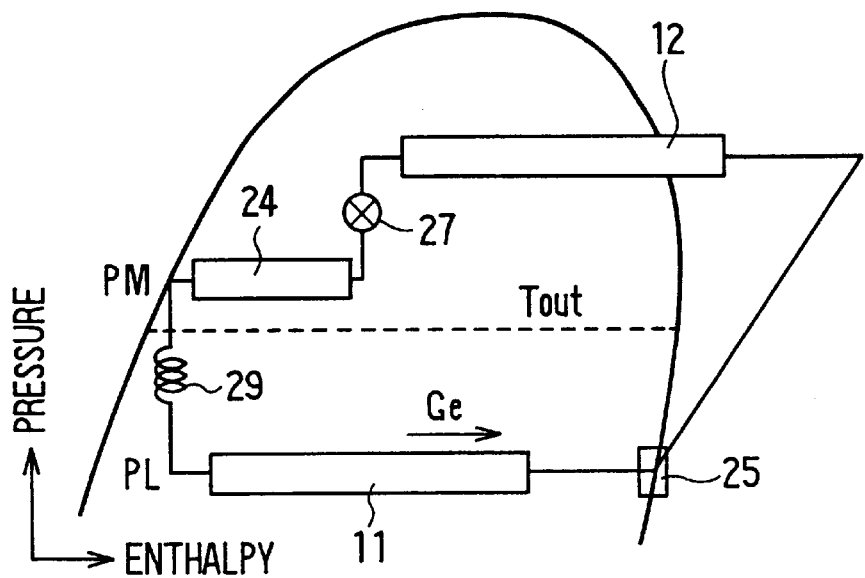
FIG. 11 is a Mollier diagram of the refrigerant cycle system during a second dehumidifying operation D2 according to the first embodiment.

On the other hand, when a second dehumidifying operation D2 where air blown into the passenger compartment has a low temperature is set during the dehumidifying mode, the middle pressure (PM) of refrigerant from the second pressure reducing unit 27 is set to be higher than the saturated refrigerant pressure relative to the outside air temperature (Tout), as shown in FIG. 11. Therefore, during the second dehumidifying operation D2, the exterior heat exchanger 24 is used as a condenser. Thus, in this case, the sum of the consumption power L of the compressor 22 and the heat-absorption amount Qe of the evaporator 11 is equal to the sum of the heat-radiation amount Qeh of the exterior heat exchanger 24 and the heat-radiation amount Qc of the condenser 12.

That is, the heat-radiation amount Qc of the condenser 12 is obtained by the following formula (3).

$$Qc=L+(-Qeh)+Qe \qquad (3)$$

Therefore, during the second dehumidifying operation D2, air blown from the condenser 12 has a low temperature as compared with the first dehumidifying operation D1.

That is, during the dehumidifying mode, the middle pressure of refrigerant flowing from the second pressure reducing unit 27 can be controlled by adjusting the opening degree of the second pressure reducing unit 27, so that the temperature of air blown into the passenger compartment can be controlled continuously.

Next, an improvement of the heating capacity when the outside air temperature is low will be described with reference to the Mollier diagram in FIG. 9. In a comparison heat pump type refrigerant cycle system where suction pressure of refrigerant sucked into the compressor 22 is lowered when the outside air temperature is low in the heating mode, the specific volume of refrigerant sucked into the compressor becomes larger. Therefore, refrigerant amount G1 sucked into the compressor 22 is reduced, and the heating capacity of the refrigerant cycle system is reduced. Further, in the comparison refrigerant cycle system, the compression ratio of the compressor 22 is increased because of the decrease in the suction pressure. Therefore, refrigerant temperature Td discharged from the compressor 22 rises to T1 in FIG. 9. Consequently, in the comparison refrigerant cycle system, the compressor 22 cannot be used at its maximum capacity (maximum rotation speed) to protect itself.

However, in first embodiment of the present invention, during the heating mode, a part of refrigerant from the interior condenser 12 is press-reduced through the first pressure reducing unit 26, and is heat-exchanged in the refrigerant-refrigerant heat exchanger 23 to be gasified. Thereafter, the gasified refrigerant is returned into a compression middle state of the compressor 22 through the gas injection passage 22d. Therefore, the work of compression is performed as much as the total amount of the refrigerant amount Ge sucked into the compressor 22 and the gas-injected refrigerant amount Gi. As a result, the amount of compression is increased, and the amount of the radiating of the refrigerant in the condenser 12 is also increased, thus improving the heating capacity.

Further, middle-pressure gaseous refrigerant is injected into the compressor 22 on the compression middle state, so that the gaseous refrigerant being compressed and heated is cooled by the middle-pressure refrigerant. Therefore, the refrigerant temperature Td discharged from the compressor 22 is lowered to T2 in FIG. 9. Consequently, the compressor 22 can be used at its maximum capacity (maximum rotational speed).

According to the above-mentioned first embodiment, the heating capacity is improved effectively even when the outside air temperature is low.

Further, an improvement of oil returning performance when the heating mode is performed with a low heating load (low rotation speed of compressor) will be described. In a comparison refrigerant cycle system where the super-heating degree of refrigerant sucked into the compressor 22 is controlled by a thermal expansion valve, when the heating mode is performed with the low heating load for the middle season, the flow amount of low-pressure refrigerant passing through the exterior heat exchanger 24 is decreased due to decrease of the rotation speed of the compressor 22. Therefore, in this case, oil stays in the exterior heat exchanger 24, and is hardly returned into the compressor 22.

However, according to the first embodiment of the present invention, because the refrigerant-refrigerant heat exchanger 23 is provided in the refrigerant cycle system, a gas-liquid separator for the gas refrigerant injection of the compressor 22 is not necessary. Therefore, the super-heating degree (SH) of refrigerant sucked into the compressor 22 can be controlled to zero (i.e., SH=0) only by the accumulator 25 provided at the refrigerant suction side of the compressor 22. Further, because liquid refrigerant containing a predetermined amount oil is also returned to the compressor 22 from the oil-returning hole of the refrigerant outlet pipe 25a of the accumulator 25, a sufficient oil amount can be returned into the compressor 22 even when the heating mode is performed with the low heating load.

Further, according to the first embodiment of the present invention, because the air inlet passage of the condenser 12 is closed and the bypass passage 12a is opened by the passage switching doors 16, 17 during the cooling mode, the condenser 12 is used as a refrigerant passage for a high-pressure refrigerant during the cooling mode. Thus, in any one of the heating, cooling and dehumidifying modes, high-pressure high-temperature gas refrigerant discharged from the compressor 22 always flows in one way toward the exterior heat exchanger 24 through the condenser 12. As a result, a four-way valve for reversing the flow direction of refrigerant or a check valve for switching the flow direction of refrigerant can be omitted, and the number of valves such as an electromagnetic valve can be reduced. Accordingly, the refrigerant pipe structure of the refrigerant cycle 21 can be made simple.

Figure 12:
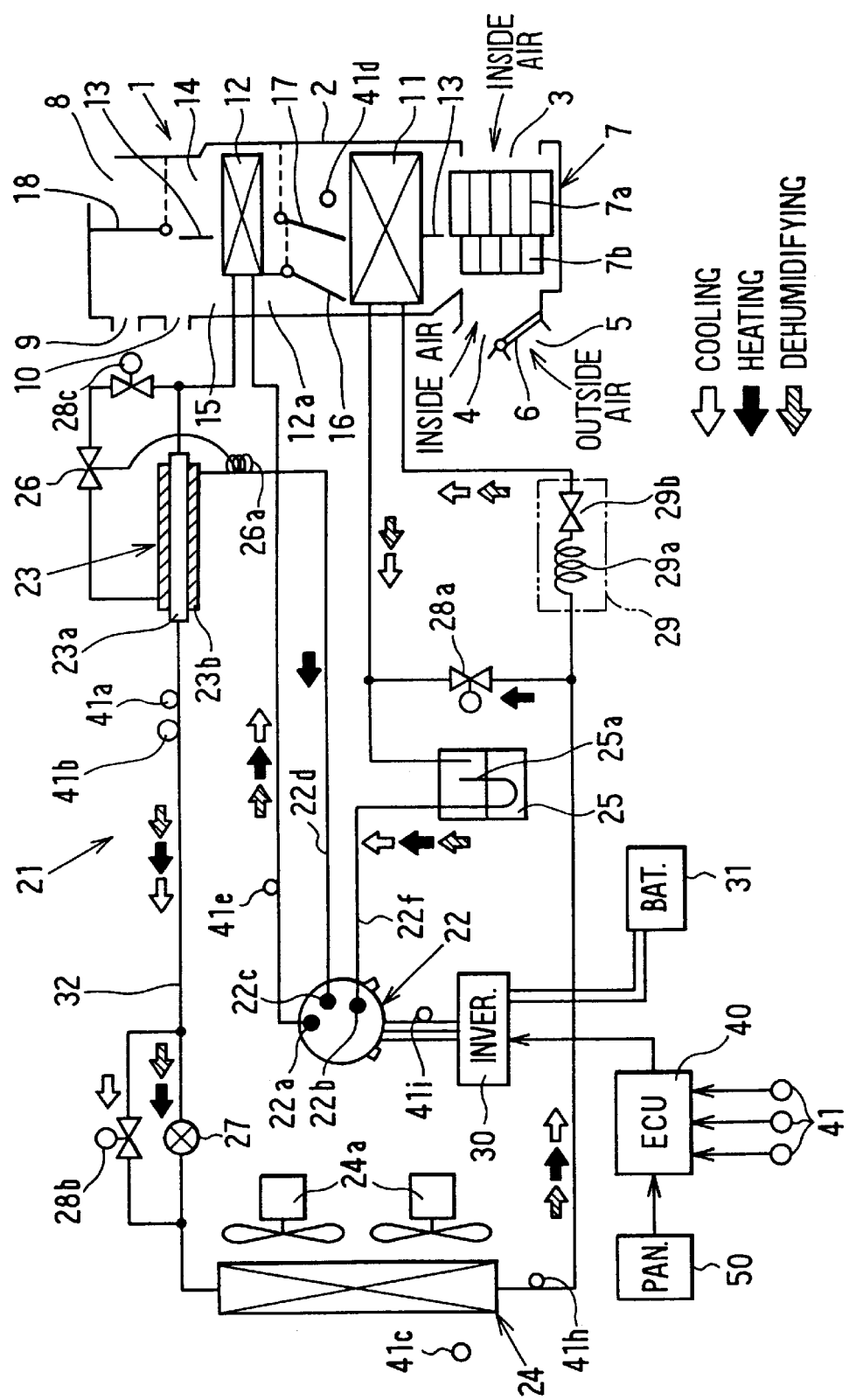
FIG. 12 is a schematic diagram showing a refrigerant cycle system according to a second preferred embodiment of the present invention.

A second preferred embodiment of the present invention will be now described with reference to FIG. 12. In the above-described first embodiment of the present invention, the first pressure reducing unit 26 is formed by an electrical expansion valve disposed in the gas injection passage 22d. In the second embodiment, the first pressure reducing unit 26 is a thermal expansion valve having a temperature sensing cylinder 26a. Further, an electromagnetic valve 28c is provided in the gas injection passage 22d on an upstream refrigerant side of the first pressure reducing unit 26 (thermal expansion valve). The electromagnetic valve 28c is closed during the cooling mode or the dehumidifying mode, and is opened during the heating mode, by the control unit 40.

Thus, in the second embodiment, during the heating mode, the pressure of a part of refrigerant flowing from the condenser 12 can be decompressed to a middle pressure by the first pressure reducing unit 26 composed of the thermal expansion valve, and the super-heating degree of middle-pressure refrigerant can be adjusted to a predetermined degree by the thermal expansion valve. In the second embodiment, the other portions are similar to those in the first embodiment of the present invention, and the explanation thereof is omitted.

A third preferred embodiment of the present invention will be now described with reference to FIGS. 13, 14. In the above-described first and second embodiments of the present invention, gas refrigerant discharged from the compressor 22 always flows into the interior condenser 12 in any one of the heating, cooling and dehumidifying modes. However, in the third embodiment of the present invention, a four-way valve 33 controlled by the control unit 40 is disposed between the discharge port 22a of the compressor 22 and the interior condenser 12, so that the flow direction of refrigerant from the compressor 22 is switched.

Figure 13:
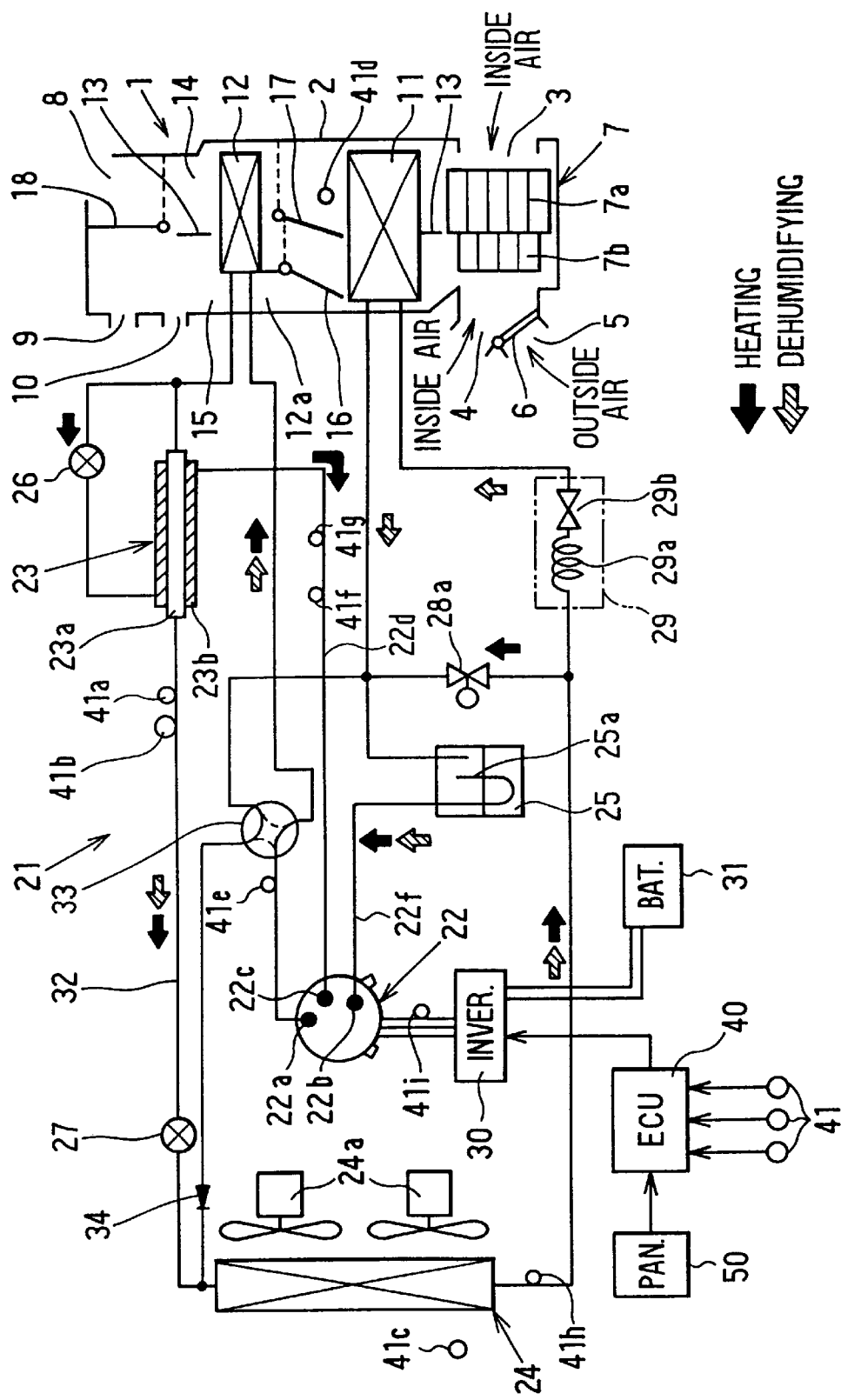
FIG. 13 is a schematic diagram showing a refrigerant cycle system during a heating mode and a dehumidifying mode according to a third preferred embodiment of the present invention.

FIG. 13 shows the operation position of the four-way valve 33 and flow direction of refrigerant, during the heating mode and the dehumidifying mode. That is, during the heating mode or the dehumidifying mode, the discharge port 22a of the compressor 22 communicates with the interior condenser 12 through the four-way valve 33. Further, the refrigerant inlet of the exterior heat exchanger 24 is connected to the refrigerant inlet of the accumulator 25 through the four-way valve 33. However, in this case, a refrigerant flow from the refrigerant inlet of the exterior heat exchanger 24 to the refrigerant inlet of the accumulator 25 is prevented by a check valve 34.

Figure 14:
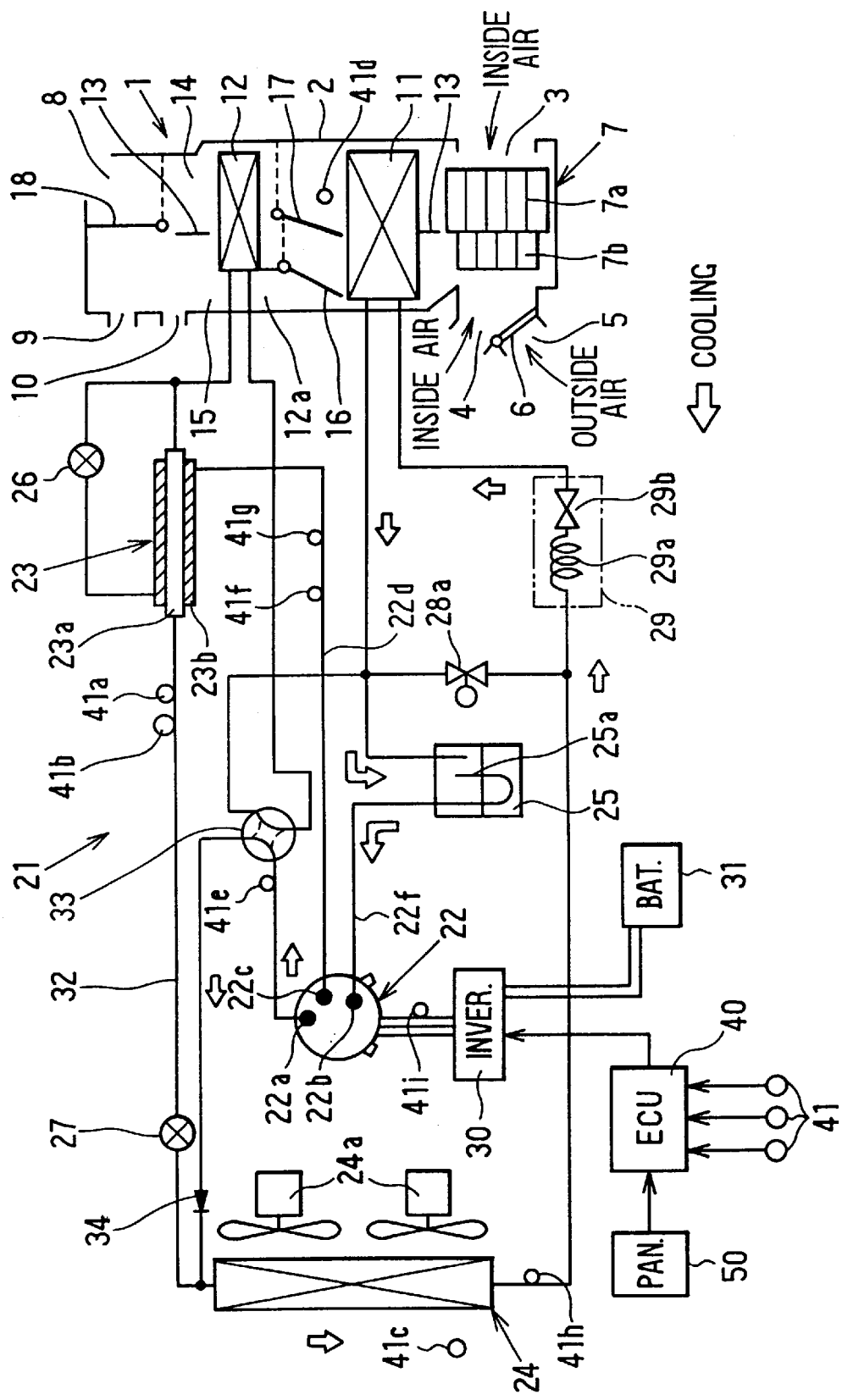
FIG. 14 is a schematic diagram showing the refrigerant cycle system during a cooling mode according to the third embodiment of the present invention.

FIG. 14 shows the operation position of the four-way valve 33 and flow direction of refrigerant, during the cooling mode. That is, during the cooling mode, the discharge port 22a of the compressor 22 is connected to the exterior heat exchanger 24 through the four-way valve 33 and the check valve 34. Therefore, during the cooling mode, gas refrigerant discharged from the compressor 22 directly flows into the exterior heat exchanger 24 without flowing into the interior condenser 12. That is, no refrigerant flows through the interior condenser 12 during the cooling mode. Therefore, in the third embodiment, the inlet air passage of the interior condenser 12 and the bypass passage 12a may be opened by the passage switching doors 16, 17. In the third embodiment, the other portions are similar to those in the first embodiment, and the explanation thereof is omitted.

Figure 15:
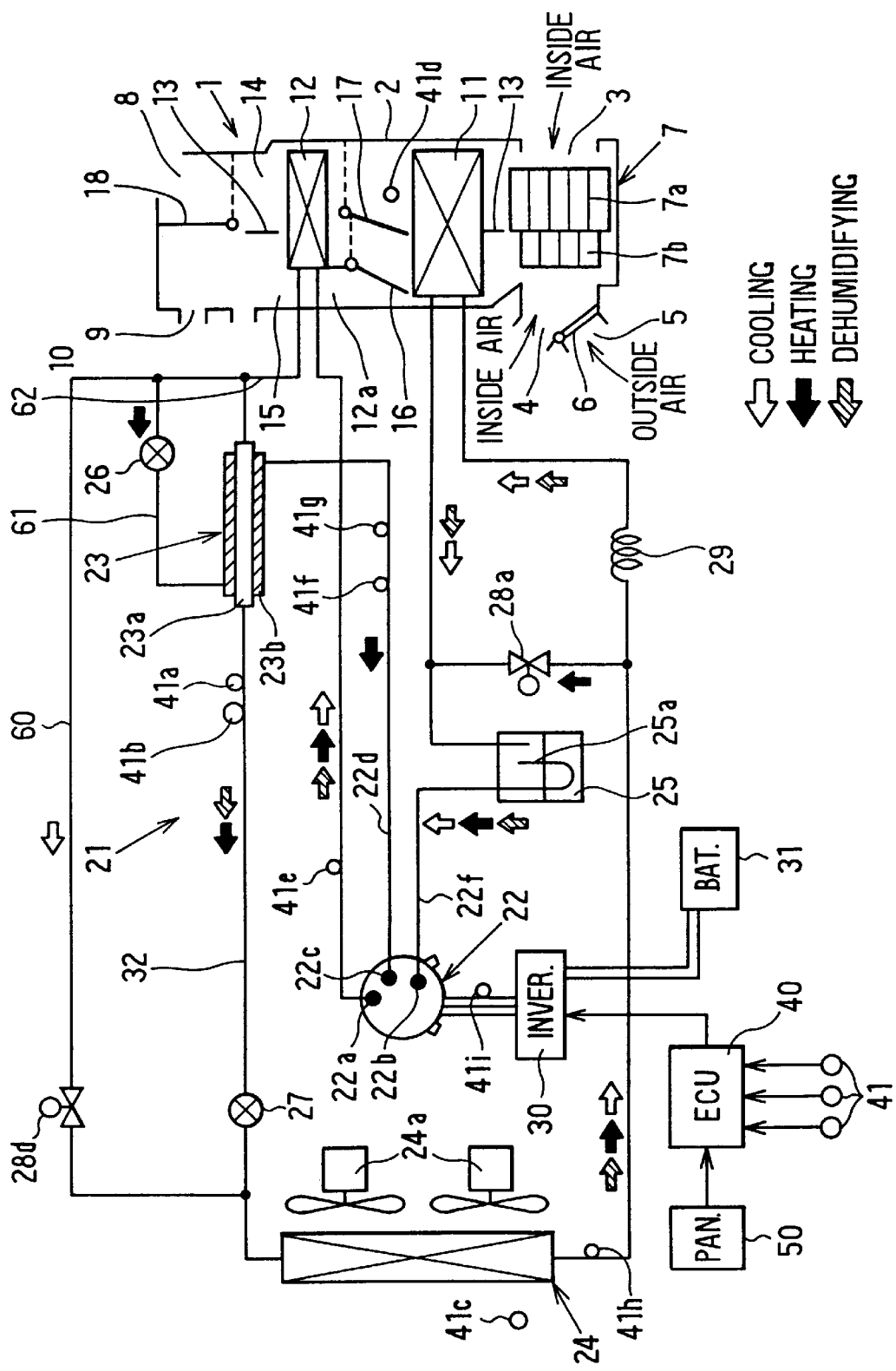
FIG. 15 is a schematic diagram showing a refrigerant cycle system according to a fourth preferred embodiment of the present invention.

A fourth preferred embodiment of the present invention will be now described with reference to FIG. 15. In the above-described first embodiment of the present invention, the electromagnet valve 28b is connected to the second pressure reducing unit 27 in parallel with the second pressure reducing unit 27. However, in the fourth embodiment of the present invention, a bypass passage 60 is provided as shown in FIG. 15 so that refrigerant from the condenser 12 can be directly introduced into the refrigerant inlet side of the exterior heat exchanger 24 through the bypass passage 60 while bypassing the refrigerant-refrigerant heat exchanger 23 and the second pressure reducing unit 27. Further, in the fourth embodiment, the electromagnetic valve 28b is disposed in the bypass passage 60.

According to the fourth embodiment of the present invention, when the electromagnet valve 28b is opened during the cooling mode, refrigerant discharged from the interior condenser 12 directly flows into the exterior heat exchanger 24 from the upstream refrigerant side of the refrigerant-refrigerant heat exchanger 23 while bypassing the refrigerant-refrigerant heat exchanger 23 and the second pressure reducing unit 27. Therefore, it is compared with a case where refrigerant flows through the refrigerant-refrigerant heat exchanger 23 during the cooling mode, pressure loss due to the refrigerant-refrigerant heat exchanger 23 can be prevented during the cooling mode, and refrigerant cycle effect can be improved during the cooling mode. Generally, refrigerant amount circulating in the refrigerant cycle is increased during the cooling mode. Therefore, in the fourth embodiment of the present invention, the refrigerant-refrigerant heat exchanger 23 can be designed and formed without considering the pressure loss during the cooling mode. As a result, the size and the weight of the refrigerant-refrigerant heat exchanger 23 can be reduced, and the refrigerant-refrigerant heat exchanger 23 can be produced in low cost.

In the fourth embodiment of the present invention, as shown in FIG. 15, the bypass passage 60 is branched from a bypass passage 61 where the first pressure reducing unit 26 is provided. However, the bypass passage 60 may be branched from a main passage 62 connecting the outlet of the condenser 12 and the inlet of the refrigerant-refrigerant heat exchanger 23.

In the fourth embodiment of the present invention, the operation of the refrigerant cycle system during the heating mode or the dehumidifying mode is similar to that in the above-described first embodiment, and the explanation thereof is omitted.

Figure 16:
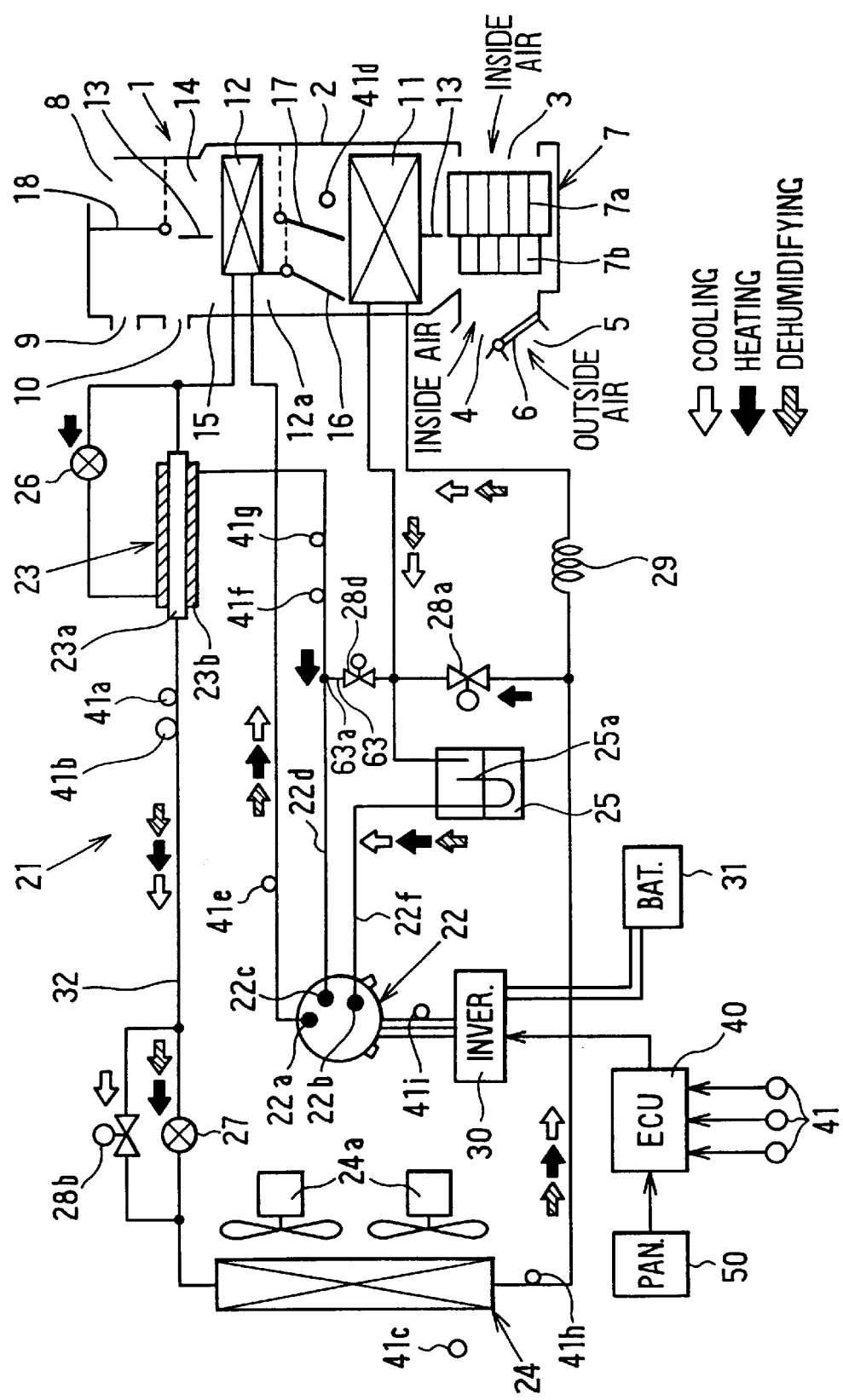
FIG. 16 is a schematic diagram showing a refrigerant cycle system according to a fifth preferred embodiment of the present invention.
Figure 17:
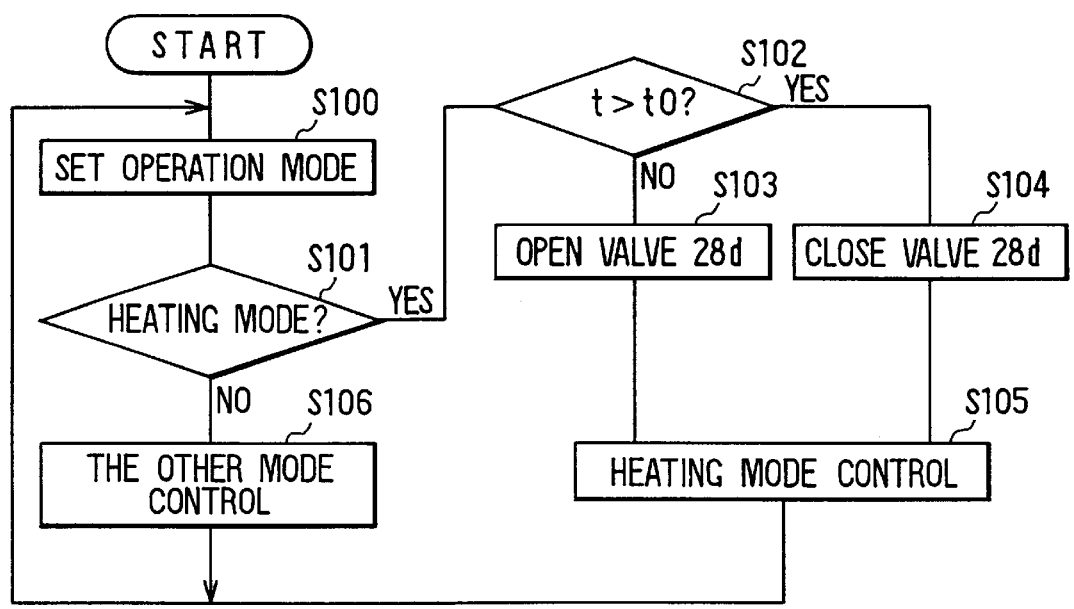
FIG. 17 is a flow diagram showing control process of the refrigerant cycle system according to the fifth embodiment.

A fifth preferred embodiment of the present invention will be now described with reference to FIGS. 16, 17. FIG. 16 shows a refrigerant cycle system according to the fifth embodiment. As shown in FIG. 16, in the fifth embodiment, liquid refrigerant staying in the gas injection passage 22d is introduced into an upstream refrigerant side of the accumulator 25 during the heating mode, so that liquid refrigerant is prevented from returning into the compressor 22 through the gas injection passage 22d.

That is, as shown in FIG. 16, a bypass passage 63 connecting the gas injection passage 22d and the upstream refrigerant side of the accumulator 25 is provided, and an electromagnetic valve 28d is disposed in the bypass passage 63.

In the fifth embodiment, a valve port diameter (i.e., valve opening area) of the electromagnetic valve 28d is set to be larger than a port diameter of the gas injection port 22c of the compressor 22, so that refrigerant in the gas injection passage 22d flows into the accumulator 25 through the bypass passage 63 when the electromagnetic valve 28d is opened. However, when it is difficult to set the valve port diameter of the electromagnetic valve 28d to be larger than the port diameter of the gas injection port 22c of the compressor 22, an additional electromagnetic valve is further disposed between a branch port 63a of the bypass passage 63 and the gas injection port 22c of the compressor 22, and the additional electromagnetic valve is closed when the electromagnetic valve 28d is opened.

Next, operation of the refrigerant cycle system according to the fifth embodiment of the present invention will be now described with reference to FIG. 17. The control routine shown in FIG. 17 is started, when the air conditioner starts the operation. At step S100, an operation mode in the refrigerant cycle system is set in accordance with the operation position of the temperature setting lever in FIG. 2. Next, at step S101, it is determined whether or not the operation mode is the heating mode. When the operation mode is the heating mode, it is determined whether or not a predetermined time "t0" is passed after the heating mode starts at step S102. That is, when the time "t" after the heating mode starts does not exceed the predetermined time "t0", the electromagnetic valve 28d is opened. On the other hand, when the time "t" after the heating mode starts exceeds the predetermined time "t0", the electromagnetic valve 28d is closed at step S104.

The predetermined time "t0" is set so that liquid refrigerant staying in the gas injection passage 22d is sufficiently discharged to the upstream refrigerant side of the accumulator 25. Therefore, during the predetermined time "t0" after the heating mode starts, liquid refrigerant staying in the gas injection passage 22d can flow into the accumulator 25 through the bypass passage 63 by opening the electromagnetic valve 28d. Thus, it can prevent liquid refrigerant staying in the gas injection passage 22d from being returned into the compressor 22 at a staring time of the heating mode. As a result, a trouble of the compressor 22 due to the returned liquid refrigerant can be prevented, operation performance of the compressor 22 can be improved, and the effect of the refrigerant cycle can be also improved.

After operation at step S103 or at step S104 is performed, heating mode control is performed at step S105. For example, the operation member such as the first pressure reducing unit 28 is controlled as described in the above-described first embodiment (FIG. 8).

On the other hand, when the heating mode is not determined at step S101, that is, when the other mode such as the cooling mode or the dehumidifying mode is determined at step S101, the other mode control such as the cooling mode control or the dehumidifying mode control is performed at step S106. At step S106, for example, the opening degree of the second pressure reducing unit 27 is controlled as shown in FIG. 8.

In the fifth embodiment of the present invention, until the predetermined time t0 is passed after the heating mode starts, the electromagnetic valve 28d is opened so that liquid refrigerant staying in the gas injection passage 22d flows into the accumulator 25 through the bypass passage 63. However, the opening/closing operation of the electromagnetic valve 28d may be controlled by using the other methods. That is, the super-heating degree of the middle-pressure refrigerant, which can be detected by the temperature sensor 41f and the pressure sensor 41g disposed in the gas injection passage 22d, is generally zero, at the start time of the heating mode. After the heating mode starts, heat exchange is performed in the refrigerant-refrigerant heat exchanger 23, and the super-heating degree of the middle pressure detected by the temperature sensor 41f and the pressure sensor 41g is increased. Thus, the electromagnetic valve 28d may be opened until the super-heating degree of the middle-pressure refrigerant is increased to a predetermined degree after the heating mode starts, and the electromagnetic valve 28d may be closed after the super-heating degree of the middle-pressure refrigerant is increased to the predetermined degree.

Further, the electromagnetic valve 18d may be opened until an electrical current applied to the compressor 22, detected by the electrical current sensor 41i, the rotation speed of the compressor 22, or the high-refrigerant pressure detected by the pressure sensor 41b is increased to a predetermined value. Thereafter, the electromagnetic valve 28d may be closed after the detected value is increased to the predetermined value.

A sixth predetermined embodiment of the present invention will be now described with reference to FIG. 18. FIG. 18 shows a refrigerant cycle system of the six embodiment. As shown in FIG. 18, in the six embodiment, the structure of the above-described fourth embodiment, where the bypass passage 60 through which refrigerant bypasses the refrigerant-refrigerant heat exchanger 23 is provided and the electromagnetic valve 28b is disposed in the bypass passage 60, and the structure of the above-described fifth embodiment, where the bypass passage 63 through which liquid refrigerant staying in the gas injection passage 22d flows into the accumulator 25 is provided and the electromagnetic valve 28d is provided in the bypass passage 63, are combined. Therefore, in the sixth embodiment, the effects according to the fourth and fifth embodiments can be proposed.

Although the present invention has been fully described in connection with preferred embodiments thereof with reference to the accompanying drawings, it is to be noted that various changes and modifications will become apparent to those skilled in the art.

For example, in the above-described first embodiment of the present invention, when the temperature of air blown into the passenger compartment is further increased during the first dehumidifying operation D1, the opening degree of the first pressure reducing unit 26 may be controlled similarly to the heating mode, so that gas refrigerant may be injected into the compressor 22 through the gas injection passage 22d. In this case, by increasing the compressor power L and the super-cooling degree of high-pressure refrigerant at the inlet of the second pressure reducing unit 27, heat-radiation amount in the condenser 12 can be made larger, and the temperature of air blown into the passenger compartment can be made higher.

In the above-described first embodiment of the present invention, during the heating mode, the first pressure reducing unit 26 is always opened by a predetermined opening degree, and the gas refrigerant is injected into the compressor 22. However, the heating mode may be divided into a first heating operation H1 where the temperature of air blown into the passenger compartment is set to be higher and a second heating operation H2 where the temperature of air blown into the passenger compartment is set to be lower. In this case, the first pressure reducing unit 26 is opened during the first heating operation H1 similarly to the above-described first embodiment, and the first pressure reducing unit 26 is closed during the second heating operation H2 so that the gas injection into the compressor 22 is stopped during the second heating operation H2.

An electrical expansion valve is used as the first pressure reducing unit 26 in the above-described first embodiment, and a thermal expansion valve is used as the first pressure reducing unit 26 in the above-described second embodiment. However, as the first pressure reducing unit 26, a fixed throttle may be used, and an opening/closing unit may be operatively linked with the fixed throttle.

In each of the above-described first, second, fourth and fifth embodiments, during the cooling mode, refrigerant bypasses the second pressure reducing unit 27. However, during the dehumidifying mode, refrigerant may bypass said second pressure reducing unit 27 and the refrigerant-refrigerant heat exchanger 23. Further, during the dehumidifying mode, refrigerant passing through the refrigerant-refrigerant heat exchanger 23 may bypasses the second pressure reducing unit 27. That is, during the dehumidifying mode, refrigerant discharged from the discharge port 22a of the compressor 22 may circulates in the refrigerant cycle 21 through the condenser 12, the refrigerant-refrigerant heat exchanger 23, the exterior heat exchanger 24, the third pressure reducing unit 29, the evaporator 11, the accumulator 25 and the suction port 22b of the compressor 22 in this order, while bypassing the second pressure reducing unit 27.

Further, in each of the above-described embodiments, two plate-like passage switching doors 16, 17 operatively linked from each other are used as a switching unit for switching the air flow into the condenser 12 and the air flow into the bypass passage 12a. However, as the switching unit, a single plate-like door or a film-like door or the like may be used. Further, in the above-described embodiments of the present invention, during the cooling mode, the inlet air passage of the condenser 12 is closed by the switching doors 16, 17. However, during the cooling mode, the inlet air passage of the condenser 12 may be slightly opened. Similarly, during the heating mode or the dehumidifying mode, the bypass passage 12a may be slightly opened by the switching doors 16, 17.

Such changes and modifications are to be understood as being within the scope of the present invention as defined by the appended claims.

What is claimed is:

1. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

a condenser disposed in said air passage, in which high-pressure refrigerant discharged from said discharge port of said compressor flows to heat air in said air passage;

a first pressure reducing unit for decompressing a part of high-pressure refrigerant discharged from said condenser to have a middle pressure during a heating mode for heating the compartment;

a refrigerant-refrigerant heat exchanger for performing heat exchange between the other part of high-pressure refrigerant discharged from said condenser and middle-pressure refrigerant having passed through said first pressure reducing unit so that high-pressure refrigerant directly from said condenser is cooled and middle-pressure refrigerant from said first pressure reducing unit is evaporated;

a second pressure reducing unit for decompressing high-pressure refrigerant cooled in said refrigerant-refrigerant heat exchanger to a low pressure during said heating mode;

an exterior heat exchanger, disposed outside said air passage, for performing heat exchange between low-pressure refrigerant after passing through said second pressure reducing unit and outside air during said heating mode;

an accumulator for separating low-pressure refrigerant from said exterior heat exchanger during said heating mode into gas refrigerant and liquid refrigerant, and for introducing gas refrigerant and oil into said suction port of said compressor;

an evaporator disposed in said air passage on an upstream air side of said condensor, in which low-pressure gas-liquid refrigerant in said refrigerant cycle flows to cool air in said air passage; and a third pressure reducing unit, disposed at a refrigerant inlet side of said evaporator, for decompressing refrigerant to be introduced into said evaporator to a low pressure during a cooling mode for cooling the compartment; wherein said refrigerant cycle is formed in such a manner that middle-pressure gas refrigerant evaporated in said refrigerant-refrigerant heat exchanger is introduced into said gas injection port of said compressor during said heating mode;

during said cooling mode, said refrigerant cycle is formed in such a manner that high-pressure gas refrigerant discharged from said compressor is heat-exchanged with outside air in said exterior heat exchanger, and low-pressure refrigerant having passed through said evaporator is introduced into said accumulator; and said refrigerant cycle includes a first refrigerant bypass passage through which refrigerant discharged from said condenser directly introduced into said exterior heat exchanger while bypassing said refrigerant-refrigerant heat exchanger and said second pressure reducing unit.

2. The refrigerant cycle system according to claim 1, further comprising an opening/closing unit disposed in said first refrigerant bypass passage, said opening/closing unit being opened during said cooling mode so that refrigerant from said condenser passes through said first refrigerant bypass passage while bypassing said refrigerant-refrigerant heat exchanger and said second pressure reducing unit.

3. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

a condenser disposed in said air passage, in which high-pressure refrigerant discharged from said discharge port of said compressor flows to heat air in said air passage;

a first pressure reducing unit for decompressing a part of high-pressure refrigerant discharged from said condenser to have a middle pressure during a heating mode for heating the compartment;

a refrigerant-refrigerant heat exchanger for performing heat exchange between the other part of high-pressure refrigerant discharged from said condensor and middle-pressure refrigerant having passed through said first pressure reducing unit so that high-pressure refrigerant directly from said condenser is cooled and middle-pressure refrigerant from said first pressure reducing unit is evaporated;

a second pressure reducing unit for decompressing high-pressure refrigerant cooled in said refrigerant-refrigerant heat exchanger to a low pressure during said heating mode;

an exterior heat exchanger, disposed outside said air passage, for performing heat exchange between low-pressure refrigerant after passing through said second pressure reducing unit and outside air during said heating mode;

an accumulator for separating low-pressure refrigerant from said exterior heat exchanger during said heating mode into gas refrigerant and liquid refrigerant, and for introducing gas refrigerant and oil into said suction port of said compressor;

an evaporator disposed in said air passage on an upstream air side of said condensor, in which low-pressure gas-liquid refrigerant in said refrigerant cycle flows to cool air in said air passage; and a third pressure reducing unit, disposed at a refrigerant inlet side of said evaporator, for decompressing refrigerant to be introduced into said evaporator to a low pressure during a cooling mode for cooling the compartment; wherein said refrigerant cycle is formed in such a manner that middle-pressure gas refrigerant evaporated in said refrigerant-refrigerant heat exchanger is introduced into said gas injection port of said compressor during said heating mode;

during said cooling mode, said refrigerant cycle is formed in such a manner that high-pressure gas refrigerant discharged from said compressor is heat-exchanged with outside air in said exterior heat exchanger, and low-pressure refrigerant having passed through said evaporator is introduced into said accumulator; and said refrigerant cycle includes a gas injection passage through which middle-pressure refrigerant from said refrigerant-refrigerant heat exchanger is injected into said gas injection port, and a second refrigerant bypass passage through which refrigerant in said gas injection passage on an upstream refrigerant side of said gas injection port is directly introduced into a refrigerant inlet side of said accumulator.

4. The refrigerant cycle system according to claim 3, further comprising a second opening/closing unit disposed in said second refrigerant bypass passage, said second opening/closing unit opens said second refrigerant bypass passage at a starting time of said heating mode.

5. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

a condensor disposed in said air passage, in which high-pressure refrigerant discharged from said discharge port of said compressor flows to heat air in said air passage;

a first pressure reducing unit for decompressing a part of high-pressure refrigerant discharged from said condenser to have a middle pressure during a heating mode for heating the compartment; and a refrigerant-refrigerant heat exchanger for performing heat exchange between the other part of high-pressure refrigerant discharged from said condenser and middle-pressure refrigerant having passed through said first pressure reducing unit so that high-pressure refrigerant directly from said condenser is cooled and middle-pressure refrigerant from said first pressure reducing unit is evaporated;

wherein said refrigerant cycle is formed in such a manner that middle-pressure gas refrigerant evaporated in said refrigerant-refrigerant heat exchanger is introduced into said gas injection port of said compressor during said heating mode;

said first pressure reducing unit is disposed to control a super-heating degree of middle-pressure gas refrigerant before being introduced into said gas injection port of said compressor; and said first pressure reducing unit includes a third opening/closing unit for switching a refrigerant flow, and a thermal expansion valve combined with said third opening/closing unit.

6. A refrigerant cycle system for an air conditioner for a compartment. said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

a condensor disposed in said air passage, in which high-pressure refrigerant discharged from said discharge port of said compressor flows to heat air in said air passage;

a first pressure reducing unit for decompressing a part of high-pressure refrigerant discharged from said condenser to have a middle pressure during a heating mode for heating the compartment;

a refrigerant-refrigerant heat exchanger for performing heat exchange between the other part of high-pressure refrigerant discharged from said condenser and middle-pressure refrigerant having passed through said first pressure reducing unit so that high-pressure refrigerant directly from said condenser is cooled and middle-pressure refrigerant from said first pressure reducing unit is evaporated;

a second pressure reducing unit for decompressing high-pressure refrigerant cooled in said refrigerant-refrigerant heat exchanger to a low pressure during said heating mode;

an exterior heat exchanger, disposed outside said air passage, for performing heat exchange between low-pressure refrigerant after passing through said second pressure reducing unit and outside air during said heating mode; an accumulator for separating low-pressure refrigerant from said exterior heat exchanger during said heating mode into gas refrigerant and liquid refrigerant, and for introducing gas refrigerant and oil into said suction port of said compressor;

an evaporator disposed in said air passage on an upstream air side of said condenser, in which low-pressure gas-liquid refrigerant in said refrigerant cycle flows to cool air in said air passage; and a third pressure reducing unit, disposed at a refrigerant inlet side of said evaporator for decompressing refrigerant to be introduced into said evaporator to a low pressure during a cooling mode for cooling the compartment; wherein said refrigerant cycle is formed in such a manner that middle-pressure gas refrigerant evaporated in said refrigerant-refrigerant heat exchanger is introduced into said gas injection port of said compressor during said heating mode;

during said cooling mode, said refrigerant cycle is formed in such a manner that high-pressure gas refrigerant discharged from said compressor is heat-exchanged with outside air in said exterior heat exchanger, and low-pressure refrigerant having passed through said evaporator is introduced into said accumulator; and said second pressure reducing unit is disposed to control a super-cooling degree of high-pressure refrigerant cooled in said refrigerant-refrigerant heat exchanger.

7. The refrigerant cycle system according to claim 6, wherein said second pressure reducing unit is an electrical expansion valve in which an opening degree is electrically controlled.

8. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

an evaporator, disposed in said air passage, for cooling air;

a condenser for heating air by using high-pressure refrigerant flowing therethrough from said discharge port of said compressor, said condenser being disposed in said air passage at a downstream air side from said evaporator to form an air bypass passage through which air having passed through said evaporator bypasses said condenser;

a door unit for adjusting an air amount passing through said condenser and an air amount passing through said bypass passage;

a first pressure reducing unit for decompressing a part of high-pressure refrigerant discharged from said condenser to have a middle pressure;

a refrigerant-refrigerant heat exchanger for performing heat exchange between the other part of high-pressure refrigerant introduced from said condenser and middle-pressure refrigerant having passed through said first pressure reducing unit;

a second pressure reducing unit for decompressing high-pressure refrigerant cooled in said refrigerant-refrigerant heat exchanger;

an exterior heat exchanger, disposed outside said air passage, for performing heat exchange between refrigerant flowing therein and outside air;

a third pressure reducing unit, disposed at a refrigerant inlet side of said evaporator, for decompressing refrigerant before being introduced into said evaporator;

an accumulator for separating low-pressure refrigerant in said refrigerant cycle into gas refrigerant and liquid refrigerant, and for introducing gas refrigerant and oil into said suction port of said compressor, wherein:

in a heating mode for heating the compartment, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said accumulator and said suction port of said compressor in this order, while refrigerant discharged from said discharge port of said compressor circulates through said condenser, said first pressure reducing unit, said refrigerant-refrigerant heat exchanger and said gas injection port of said compressor in this order;

in a cooling mode for cooling the compartment, said door unit is operated so that air passes through said air bypass passage, and refrigerant discharged from said discharge port of said compressor circulates through said condenser, said exterior heat exchanger, said third pressure reducing unit, said evaporator, said accumulator and said suction port of said compressor in this order; and in a dehumidifying mode for dehumidifying the compartment, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said third pressure reducing unit, said evaporator, said accumulator and said suction port of said compressor in this order.

9. The refrigerant cycle system according to claim 8, further comprising an operation setting unit for setting a first dehumidifying operation where temperature of air blown from said air outlet is higher than a predetermined temperature, and a second dehumidifying operation where temperature of air blown from said air outlet is lower than the predetermined temperature, during said dehumidifying mode, wherein:

in said first dehumidifying operation, an opening degree of said second pressure reducing unit is controlled so that refrigerant flowing through said exterior heat exchanger is evaporated by outside air; and in said second dehumidifying operation, the opening degree of said second pressure reducing unit is controlled so that refrigerant flowing through said exterior heat exchanger is condensed by outside air.

10. The refrigerant cycle system according to claim 8, further comprising an operation setting unit for setting a first heating operation where temperature of air blown from said air outlet is higher than a predetermined temperature, and a second heating operation where temperature of air blown from said air outlet is lower than the predetermined temperature, during said heating mode, wherein:

in said first heating operation, high-pressure refrigerant from said condenser flows into said first pressure reducing unit so that middle-pressure gas refrigerant is supplied into said gas injection port of said compressor through said refrigerant-refrigerant heat exchanger; and in said second heating operation, the supply of middle-pressure gas refrigerant into said gas injection port of said compressor is stopped.

11. The refrigerant cycle system according to claim 8, wherein said refrigerant cycle includes a first refrigerant. bypass passage through which refrigerant discharged from said condenser directly introduced into said exterior heat exchanger while bypassing said refrigerant-refrigerant heat exchanger and said second pressure reducing unit.

12. The refrigerant cycle system according to claim 11, further comprising a first opening/closing unit disposed in said first refrigerant bypass passage, said first opening/closing unit being opened during said cooling mode so that refrigerant from said condenser passes through said first refrigerant bypass passage while bypassing said refrigerant-refrigerant heat exchanger and said second pressure reducing unit.

13. The refrigerant cycle system according to claim 8, wherein said refrigerant cycle includes a gas injection passage through which middle-pressure refrigerant from said refrigerant-refrigerant heat exchanger is injected into said gas injection port, and a second refrigerant bypass passage through which refrigerant in said gas injection passage on an upstream refrigerant side of said gas injection port is directly introduced into a refrigerant inlet side of said accumulator.

14. The refrigerant cycle system according to claim 13, further comprising a second opening/closing unit disposed in said second refrigerant bypass passage, said second opening/closing unit opens said second refrigerant bypass passage at a starting time of said heating mode.

15. The refrigerant cycle system according to claim 8, wherein said first pressure reducing unit is disposed to control a super-heating degree of middle-pressure gas refrigerant before being introduced into said gas injection port of said compressor.

16. The refrigerant cycle system according to claim 8, wherein said second pressure reducing unit is disposed to control a super-cooling degree of high-pressure refrigerant cooled in said refrigerant-refrigerant heat exchanger.

17. The refrigerant cycle system according to claim 8, wherein:

in said heating mode and said dehumidifying mode, said door unit slightly opens said air bypass passage; and in said cooling mode, said door unit slightly opens an air passage of said condenser.

18. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

an evaporator, disposed in said air passage, for cooling air;

a condenser for heating air by using high-pressure refrigerant flowing therethrough from said discharge port of said compressor, said condenser being disposed in said air passage at a downstream air side from said evaporator to form an air bypass passage through which air having passed through said evaporator bypasses said condenser;

a door unit for adjusting an air amount passing through said condenser and an air amount passing through said bypass passage;

a first pressure reducing unit for decompressing a part of high-pressure refrigerant discharged from said condenser to have a middle pressure;

a refrigerant-refrigerant heat exchanger for performing heat exchange between the other part of high-pressure refrigerant introduced from said condenser and middle-pressure refrigerant having passed through said first pressure reducing unit;

a second pressure reducing unit for decompressing high-pressure refrigerant cooled in said refrigerant-refrigerant heat exchanger;

an exterior heat exchanger, disposed outside said air passage, for performing heat exchange between refrigerant flowing therein and outside air;

a third pressure reducing unit, disposed at a refrigerant inlet side of said evaporator, for decompressing refrigerant before being introduced into said evaporator;

an accumulator for separating low-pressure refrigerant in said refrigerant cycle into gas refrigerant and liquid refrigerant, and for introducing gas refrigerant and liquid refrigerant containing oil into said suction port of said compressor, wherein:

in a heating mode for heating the compartment, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said accumulator and said suction port of said compressor in this order, while refrigerant discharged from said discharge port of said compressor circulates through said condenser, said first pressure reducing unit, said refrigerant-refrigerant heat exchanger and said gas injection port of said compressor in this order;

in a cooling mode for cooling the compartment, said door unit is operated so that air passes through said air bypass passage, and refrigerant discharged from said discharge port of said compressor circulates through said condenser, said exterior heat exchanger, said third pressure reducing unit, said evaporator, said accumulator and said suction port of said compressor in this order; and in a dehumidifying mode for dehumidifying the compartment, said door unit is operated so that air passes through said condenser, and refrigerant discharged from said discharge port of said compressor circulates through said condenser, said exterior heat exchanger, said third pressure reducing unit, said evaporator, said accumulator and said suction port of said compressor in this order, while bypassing said second pressure reducing unit.

19. The refrigerant cycle system according to claim 18, wherein during said dehumidifying mode, refrigerant from said condenser flows into said exterior heat exchanger through said refrigerant-refrigerant heat exchanger.

20. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

an evaporator, disposed in said air passage, for cooling air;

a condenser for heating air by using high-pressure refrigerant flowing therethrough from said discharge port of said compressor, said condenser being disposed in said air passage at a downstream air side from said evaporator;

a first pressure reducing unit for decompressing a part of high-pressure refrigerant discharged from said condenser to have a middle pressure;

a refrigerant-refrigerant heat exchanger for performing heat exchange between the other part of high-pressure refrigerant introduced from said condenser and middle-pressure refrigerant having passed through said first pressure reducing unit;

a second pressure reducing unit for decompressing high-pressure refrigerant cooled in said refrigerant-refrigerant heat exchanger;

an exterior heat exchanger, disposed outside said air passage, for performing heat exchange between refrigerant flowing therein and outside air;

a third pressure reducing unit, disposed at a refrigerant inlet side of said evaporator, for decompressing refrigerant before being introduced into said evaporator; and an accumulator for separating low-pressure refrigerant in said refrigerant cycle into gas refrigerant and liquid refrigerant, and for introducing gas refrigerant and oil into said suction port of said compressor, wherein:

in a heating mode for heating the compartment, air passing through said condenser is blown into the compartment, and refrigerant discharged from said discharge port of said compressor circulates through said condenser, said refrigerant-refrigerant heat exchanger, said second pressure reducing unit, said exterior heat exchanger, said accumulator and said suction port of said compressor in this order, while refrigerant discharged from said discharge port of said compressor circulates through said condenser, said first pressure reducing unit, said refrigerant-refrigerant heat exchanger and said gas injection port of said compressor in this order;

in a cooling mode for cooling the compartment, air passing through said evaporator is blown into the compartment, and refrigerant discharged from said discharge port of said compressor flows through at least said exterior heat exchanger, said third pressure reducing unit, said evaporator and said accumulator in this order; and in a dehumidifying mode for dehumidifying the compartment, air passing through said evaporator and said condenser is blown into the compartment, and refrigerant discharged from said discharge port of said compressor flows through at least said condenser, said third pressure reducing unit, said evaporator and said accumulator in this order.

21. The refrigerant cycle system according to claim 20, wherein:

in the cooling mode for cooling the compartment, refrigerant discharged from said discharge port of said compressor circulates through said condenser, said exterior heat exchanger, said third pressure reducing unit, said evaporator, said accumulator and said suction port of said compressor in this order.

22. The refrigerant cycle system according to claim 20, wherein:

in the dehumidifying mode for dehumidifying the compartment, refrigerant discharged from said discharge port of said compressor circulates through said condenser, said refrigerant-refrigerant heat exchanger, said second pressure reducing unit, said exterior heat exchanger, said third pressure reducing unit, said evaporator, said accumulator and said suction port of said compressor in this order.

23. The refrigerant cycle system according to claim 22, wherein:

in the cooling mode for cooling the compartment, refrigerant discharged from said discharge port of said compressor circulates through said condenser, said exterior heat exchanger, said third pressure reducing unit, said evaporator, said accumulator and said suction port of said compressor in this order.

24. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

an evaporator, disposed in said air passage, for cooling air;

a condenser for heating air by using high-pressure refrigerant flowing therethrough from said discharge port of said compressor, said condenser being disposed in said air passage at a downstream air side from said evaporator;

a first pressure reducing unit for decompressing a part of high-pressure refrigerant discharged from said condenser to have a middle pressure;

a refrigerant-refrigerant heat exchanger for performing heat exchange between the other part of high-pressure refrigerant introduced from said condenser and middle-pressure refrigerant having passed through said first pressure reducing unit;

a second pressure reducing unit for decompressing high-pressure refrigerant cooled in said refrigerant-refrigerant heat exchanger;

an exterior heat exchanger, disposed outside said air passage, for performing heat exchange between refrigerant flowing therein and outside air;

a third pressure reducing unit, disposed at a refrigerant inlet side of said evaporator, for decompressing refrigerant before being introduced into said evaporator;

an accumulator for separating low-pressure refrigerant in said refrigerant cycle into gas refrigerant and liquid refrigerant, and for introducing gas refrigerant and oil into said suction port of said compressor; and a control unit which is disposed to set at least a cooling mode for cooling the compartment and a dehumidifying mode for dehumidifying the compartment, wherein:
in the cooling mode, air passing through said evaporator is blown into the compartment, and refrigerant discharged from said discharge port of said compressor flows through at least said exterior heat exchanger, said third pressure reducing unit, said evaporator and said accumulator in this order; and
in the dehumidifying mode, air passing through said evaporator and said condenser is blown into the compartment, and refrigerant discharged from said discharge port of said compressor flows through at least said condenser, said third pressure reducing unit, said evaporator and said accumulator in this order.

25. A refrigerant cycle system for an air conditioner for a compartment, said refrigerant cycle system comprising:
a case for forming an air passage which has an air inlet at one end thereof for sucking air and an air outlet at the other end thereof for blowing air into the compartment;
a blower for blowing air into said air passage;
a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;
an evaporator, disposed in said air passage, for cooling air;
a condenser for heating air by using high-pressure refrigerant flowing therethrough from said discharge port of said compressor, said condenser being disposed in said air passage at a downstream air side from said evaporator;
a first pressure reducing unit for decompressing a part of high-pressure refrigerant discharged from said condenser to have a middle pressure;
a refrigerant-refrigerant heat exchanger for performing heat exchange between the other part of high-pressure refrigerant introduced from said condenser and middle-pressure refrigerant having passed through said first pressure reducing unit;
a second pressure reducing unit for decompressing high-pressure refrigerant cooled in said refrigerant-refrigerant heat exchanger;
an exterior heat exchanger, disposed outside said air passage, for performing heat exchange between refrigerant flowing therein and outside air;
a third pressure reducing unit, disposed at a refrigerant inlet side of said evaporator, for decompressing refrigerant before being introduced into said evaporator;
an accumulator for separating low-pressure refrigerant in said refrigerant cycle into gas refrigerant and liquid refrigerant, and for introducing gas refrigerant and oil into said suction port of said compressor; and
a control unit which is disposed to set at least a heating mode for heating the compartment and a dehumidifying mode for dehumidifying the compartment, wherein:
in the heating mode, air passing through said condenser is blown into the compartment, and refrigerant discharged from said discharge port of said compressor circulates through said condenser, said refrigerant-refrigerant heat exchanger, said second pressure reducing unit, said exterior heat exchanger, said accumulator and said suction port of said compressor in this order, while refrigerant discharged from said discharge port of said compressor circulates through said condenser, said first pressure reducing unit, said refrigerant-refrigerant heat exchanger and said gas injection port of said compressor in this order; and
in the dehumidifying mode, air passing through said evaporator and said condenser is blown into the compartment, and refrigerant discharged from said discharge port of said compressor flows through at least said condenser, said third pressure reducing unit, said evaporator and said accumulator in this order.

26. A refrigerant cycle system for an air conditioner for a compartment, said refrigerant cycle system comprising:
a case for forming an air passage which has an air inlet at one end thereof for sucking air and an air outlet at the other end thereof for blowing air into the compartment;
a blower for blowing air into said air passage;
a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;
an evaporator, disposed in said air passage, for cooling air;
a condenser for heating air by using high-pressure refrigerant flowing therethrough from said discharge port of said compressor, said condenser being disposed in said air passage at a downstream air side from said evaporator to form an air bypass passage through which air having passed through said evaporator bypasses said condenser;
a door unit for adjusting an air amount passing through said condenser and an air amount passing through said bypass passage;
a first pressure reducing unit for decompressing a part of high-pressure refrigerant discharged from said condenser to have a middle pressure;
a refrigerant-refrigerant heat exchanger for performing heat exchange between the other part of high-pressure refrigerant introduced from said condenser and middle-pressure refrigerant having passed through said first pressure reducing unit;
a second pressure reducing unit for decompressing high-pressure refrigerant cooled in said refrigerant-refrigerant heat exchanger;
an exterior heat exchanger, disposed outside said air passage, for performing heat exchange between refrigerant flowing therein and outside air;
a third pressure reducing unit, disposed at a refrigerant inlet side of said evaporator, for decompressing refrigerant before being introduced into said evaporator;
an accumulator for separating low-pressure refrigerant in said refrigerant cycle into gas refrigerant and liquid refrigerant, and for introducing gas refrigerant and oil into said suction port of said compressor; and
a control unit which is disposed to set at least a cooling mode for cooling the compartment and a dehumidifying mode for dehumidifying the compartment, wherein:
in the cooling mode for cooling the compartment, said door unit is operated so that air passes through said air bypass passage, and refrigerant discharged from said discharge port of said compressor circulates through said condenser, said exterior heat exchanger, said third pressure reducing unit, said evaporator, said accumulator and said suction port of said compressor in this order; and in the dehumidifying mode for dehumidifying the compartment, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said third pressure reducing unit, said evaporator, said accumulator and said suction port of said compressor in this order.

27. A refrigerant cycle system for an air conditioner for a compartment, said refrigerant cycle system comprising:

a case for forming an air passage which has an air inlet at one end thereof for sucking air and an air outlet at the other end thereof for blowing air into the compartment;

a blower for blowing air into said air passage;

a compressor disposed in a refrigerant cycle, said compressor having a suction port for sucking low-pressure refrigerant in said refrigerant cycle, a gas injection port for injecting middle-pressure gas refrigerant in said refrigerant cycle thereto, and a discharge port for discharging compressed high-pressure refrigerant;

an evaporator, disposed in said air passage, for cooling air;

a condenser for heating air by using high-pressure refrigerant flowing therethrough from said discharge port of said compressor, said condenser being disposed in said air passage at a downstream air side from said evaporator to form an air bypass passage through which air having passed through said evaporator bypasses said condenser;

a door unit for adjusting an air amount passing through said condenser and an air amount passing through said bypass passage;

a first pressure reducing unit for decompressing a part of high-pressure refrigerant discharged from said condenser to have a middle pressure;

a refrigerant-refrigerant heat exchanger for performing heat exchange between the other part of high-pressure refrigerant introduced from said condenser and middle-pressure refrigerant having passed through said first pressure reducing unit;

a second pressure reducing unit for decompressing high-pressure refrigerant cooled in said refrigerant-refrigerant heat exchanger;

an exterior heat exchanger, disposed outside said air passage, for performing heat exchange between refrigerant flowing therein and outside air;

a third pressure reducing unit, disposed at a refrigerant inlet side of said evaporator, for decompressing refrigerant before being introduced into said evaporator;

an accumulator for separating low-pressure refrigerant in said refrigerant cycle into gas refrigerant and liquid refrigerant, and for introducing gas refrigerant and oil into said suction port of said compressor; and a control unit which is disposed to set at least a heating mode for heating the compartment and a dehumidifying mode for dehumidifying the compartment, wherein:

in the heating mode, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said accumulator and said suction port of said compressor in this order, while refrigerant discharged from said discharge port of said compressor circulates through said condenser, said first pressure reducing unit, said refrigerant-refrigerant heat exchanger and said gas injection port of said compressor in this order; and in the dehumidifying mode, said door unit is operated so that air passes through said condenser, and refrigerant discharged from said discharge port of said compressor circulates through said condenser, said refrigerant-refrigerant heat exchanger, said second pressure reducing unit, said exterior heat exchanger, said third pressure reducing unit, said evaporator, said accumulator and said suction port of said compressor in this order.

* * * * *